United States Patent
Muramatsu et al.

(10) Patent No.: US 10,233,853 B2
(45) Date of Patent: Mar. 19, 2019

(54) EXHAUST GAS SENSOR ARRANGEMENT STRUCTURE

(71) Applicant: SUZUKI MOTOR CORPORATION, Hamamatsu-shi, Shizuoka (JP)

(72) Inventors: Takayoshi Muramatsu, Hamamatsu (JP); Takaaki Nakashio, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 32 days.

(21) Appl. No.: 15/584,543

(22) Filed: May 2, 2017

(65) Prior Publication Data

US 2017/0350335 A1   Dec. 7, 2017

(30) Foreign Application Priority Data

Jun. 1, 2016  (JP) .................. 2016-110406

(51) Int. Cl.
| | |
|---|---|
| *F01N 3/00* | (2006.01) |
| *F02D 41/04* | (2006.01) |
| *F01N 3/20* | (2006.01) |
| *F01N 3/24* | (2006.01) |
| *F02D 41/14* | (2006.01) |
| *F01N 3/10* | (2006.01) |
| *F01N 11/00* | (2006.01) |

(52) U.S. Cl.
CPC ............ *F02D 41/04* (2013.01); *F01N 3/101* (2013.01); *F01N 3/20* (2013.01); *F01N 3/24* (2013.01); *F01N 11/007* (2013.01); *F02D 41/14* (2013.01); *F02D 41/1441* (2013.01); *F01N 2550/02* (2013.01); *F01N 2560/025* (2013.01); *F01N 2560/14* (2013.01); *F01N 2590/04* (2013.01); *F01N 2900/0416* (2013.01); *Y02A 50/2324* (2018.01); *Y02T 10/22* (2013.01); *Y02T 10/47* (2013.01)

(58) Field of Classification Search
CPC ... F01N 3/20; F01N 3/24; F01N 1/166; F01N 2240/36; F02D 41/04; F02D 41/14; B62K 11/00
See application file for complete search history.

(56) References Cited

U.S. PATENT DOCUMENTS

| | | | | |
|---|---|---|---|---|
| 7,818,964 | B2 * | 10/2010 | Muramatsu | ............ F01N 1/003 60/324 |
| 9,174,694 | B2 * | 11/2015 | Nakamura | ............ B62K 11/04 |

(Continued)

FOREIGN PATENT DOCUMENTS

| | | | | |
|---|---|---|---|---|
| JP | 06026375 | A | * 2/1994 | ........... F01N 13/008 |
| JP | 2003-206784 | A | 7/2003 | |

OTHER PUBLICATIONS

English Translation of JP06026375A.*

*Primary Examiner* — Audrey K Bradley
*Assistant Examiner* — Anthony Ayala Delgado
(74) *Attorney, Agent, or Firm* — Stein IP, LLC

(57) ABSTRACT

An exhaust gas sensor arrangement structure includes a catalyst which purifies exhaust gas of an engine; and exhaust gas sensors which detect an exhaust gas component of the engine; the catalyst is provided under the engine; and the exhaust gas sensors are provided within a width of the engine in a front/rear direction so that the catalyst is provided between the exhaust gas sensors at front and rear sides of the catalyst.

10 Claims, 13 Drawing Sheets

(56) References Cited

U.S. PATENT DOCUMENTS

| | | | | |
|---|---|---|---|---|
| 2006/0242952 A1* | 11/2006 | Muramatsu | ............. | F01N 1/003 60/299 |
| 2008/0256927 A1* | 10/2008 | Kikuchi | .................... | F01N 3/10 60/276 |
| 2011/0225953 A1* | 9/2011 | Ono | ......................... | F01N 1/02 60/276 |

\* cited by examiner

EXHAUST GAS SENSOR ARRANGEMENT STRUCTURE

CROSS-REFERENCE TO RELATED APPLICATIONS

This application claims the benefit of Japanese Patent Application JP 2016-110406, filed Jun. 1, 2016, the entire content of which is hereby incorporated by reference, the same as if set forth at length.

FIELD OF THE INVENTION

The present invention relates to an exhaust gas sensor arrangement structure.

BACKGROUND OF THE INVENTION

Recent exhaust gas regulation requires exhaust systems of vehicle engines to monitor control conditions of exhaust gas by means of in-vehicle computers. An example of an item to be monitored may include a deterioration condition of a catalyst which purifies exhaust gas (see JP-A-2003-206784). In JP-A-2003-206784, oxygen sensors are provided before and behind the catalyst respectively, and determination as to whether the catalyst is deteriorated or not can be made based on output values of these two oxygen sensors.

Specifically, numbers of times of output inversion between a rich state and a lean state in the two oxygen sensors can be used. For example, when the catalyst is normal to adsorb oxygen sufficiently, the number of times of output inversion in the downstream oxygen sensor approaches zero. Therefore, a ratio of the number of times of output inversion in the upstream oxygen sensor to that in the downstream oxygen sensor increases. On the other hand, when the catalyst is deteriorated so that an oxygen adsorbing capability of the catalyst is lowered, the number of times of output inversion in the downstream oxygen sensor approaches the number of times of output inversion in the upstream oxygen sensor. Therefore, the ratio of the number of times of output inversion in the upstream oxygen sensor to that in the downstream oxygen sensor decreases. Thus, it is possible to determine that the catalyst is deteriorated when the aforementioned ratio is lower than a predetermined value.

SUMMARY OF THE INVENTION

When determination as to whether a catalyst is deteriorated or not is made in a motorcycle, restrictions on a structure or layout of exhaust pipes or a muffler make it difficult to arrange two oxygen sensors before and behind the catalyst while securing detection accuracy.

The invention has been accomplished in consideration of the foregoing point. An object of the invention is to provide an exhaust gas sensor arrangement structure in which exhaust gas sensors can be arranged before and behind a catalyst without spoiling detection accuracy.

An exhaust gas sensor arrangement structure according to the invention, comprises: a catalyst which purifies exhaust gas of an engine; and exhaust gas sensors which detect an exhaust gas component of the engine; wherein: the catalyst is provided under the engine; and the exhaust gas sensors are provided within a width of the engine in a front/rear direction so that the catalyst is provided between the exhaust gas sensors at front and rear sides of the catalyst.

According to the configuration, the catalyst is arranged under the engine. Accordingly, the exhaust gas sensors can be arranged closely to the catalyst before and behind the catalyst. Particularly, the exhaust gas sensors are arranged in a relatively ample space under the engine. Thus, the exhaust gas sensors can be placed closely to the catalyst. As a result, detection accuracy of the exhaust gas sensors is not spoiled. In addition, the exhaust gas sensors can be placed within the width of the engine in the front/rear direction to thereby make the layout compact.

It is preferable that the exhaust gas sensor arrangement structure according to the invention further comprises: an oil pan which is provided in a lower portion of the engine; wherein: a recess portion is formed in the oil pan; the catalyst is provided to extend along the recess portion; the exhaust gas sensors include an upstream sensor which is provided at an upstream side of the catalyst and a downstream sensor which is provided at a downstream side of the catalyst; and the oil pan is positioned between the upstream sensor and the downstream sensor in a side view. According to the configuration, the catalyst is provided to extend along the recess portion of the oil pan, and the upstream sensor and the downstream sensor are arranged before and behind the catalyst. Accordingly, it is possible to make the layout compact without increasing the width of the engine.

It is preferable that the exhaust gas sensor arrangement structure according to the invention further comprises: a chamber which is connected to the downstream side of the catalyst; wherein: a recess portion is formed at a front face of the chamber; and the downstream sensor is attached to the recess portion of the chamber. According to the configuration, the downstream sensor is attached to the recess portion in the front face of the chamber. Accordingly, the downstream sensor can be arranged immediately after the catalyst even when the chamber is connected to the downstream side of the catalyst.

It is preferable that in the exhaust gas sensor arrangement structure according to the invention, the recess portion of the oil pan is provided closely to the same side as the recess portion of the chamber in a vehicle width direction. According to the configuration, the recess portion of the oil pan and the recess portion of the chamber are provided at the same side. Accordingly, it is possible to secure an arrangement space for the catalyst and the exhaust gas sensors while suppressing reduction of the volume of the oil pan to the minimum. Thus, the catalyst and the downstream sensor can be arranged closely to each other in a space formed by the recess portion of the oil pan and the recess portion of the chamber.

It is preferable that in the exhaust gas sensor arrangement structure according to the invention, the downstream sensor is arranged within a width of the chamber in a vehicle width direction in a front view. According to the configuration, the downstream sensor is arranged within the width of the chamber. Accordingly, it is possible to put the downstream sensor near to the central side of a vehicle so that it is possible to prevent the downstream sensor from steppingstones etc.

It is preferable that in the exhaust gas sensor arrangement structure according to the invention, the catalyst has a honeycomb portion, and an outer cylinder portion with which the honeycomb portion is covered; the outer cylinder portion extends to an inside of the chamber at a downstream side of the honeycomb portion; and the downstream sensor is attached to the outer cylinder portion inside the chamber. According to the configuration, the outer cylinder portion is extended up to the inside of the chamber, and the downstream sensor is attached to the outer cylinder portion inside the chamber. Accordingly, exhaust gas touches the downstream sensor before being diffused into the chamber. Therefore, it is possible to obtain a sensor output stably.

It is preferable that the exhaust gas sensor arrangement structure according to the invention, further comprises: an exhaust control valve which adjusts a flow rate of exhaust gas; wherein: the exhaust control valve is provided between the upstream sensor and the catalyst; and the upstream sensor, the exhaust control valve, the catalyst and the downstream sensor are arranged substantially on the same straight line. According to the configuration, the peripheral configuration of the exhaust gas sensors is arranged substantially on the same straight line. Accordingly, the aforementioned configuration can be arranged without increasing the dimension in the vehicle width direction. In addition, the catalyst and the downstream sensor can be arranged closely to each other even when the exhaust control valve is provided.

It is preferable that the exhaust gas sensor arrangement structure according to the invention further comprises: a chamber which is connected to the downstream side of the catalyst; wherein: the chamber has a guidance pipe which guides exhaust gas having passed through the catalyst to the downstream sensor; the guidance pipe is provided to overlap with a downstream end of the catalyst; and the downstream sensor is attached to the guidance pipe. According to the configuration, exhaust gas is guided to the downstream sensor by the guidance pipe. Accordingly, the exhaust gas is not diffused so that a sensor output can be obtained stably. Further, the degree of freedom for arranging the downstream sensor can be improved.

It is preferable that in the exhaust gas sensor arrangement structure according to the invention, the guidance pipe is provided to extend along an upstream outer wall of the chamber; and the downstream sensor is attached to penetrate the outer wall and the guidance pipe. According to the configuration, the guidance pipe is provided to extend along the outer wall of the chamber. Accordingly, the downstream sensor can be arranged on the outer wall of the chamber in which a relatively ample space can be secured. Thus, the downstream sensor does not interfere with any other peripheral component so that the downstream sensor can be arranged easily. Further, the downstream sensor can be arranged without changing the shape of the chamber and without reducing the volume thereof.

It is preferable that the exhaust gas sensor arrangement structure according to the invention further comprises: a chamber which is connected to the downstream side of the catalyst; wherein: the chamber has a guidance wall which guides exhaust gas having passed through the catalyst to the downstream sensor; the guidance wall is formed to partition a portion of an internal space of the chamber; and the downstream sensor is arranged inside a predetermined space partitioned by the guidance wall. According to the configuration, the exhaust gas is guided to the downstream sensor by the guidance wall. Accordingly, the exhaust gas is not diffused so that a sensor output can be obtained stably. Further, the degree of freedom for arranging the downstream sensor can be improved.

It is preferable that in the exhaust gas sensor arrangement structure according to the invention, the guidance wall is formed to extend along an upstream outer wall of the chamber; and the downstream sensor is attached to penetrate the outer wall. According to the configuration, the guidance wall is formed to extend along the outer wall of the chamber. Accordingly, the downstream sensor can be arranged on the outer wall of the chamber in which a relatively ample space can be secured. Thus, the downstream sensor does not interfere with any other peripheral component so that the downstream sensor can be arranged easily. Further, the downstream sensor can be arranged without changing the shape of the chamber and without reducing the volume thereof.

It is preferable that the exhaust gas sensor arrangement structure according to the invention further comprises: a chamber which is connected to the downstream side of the catalyst; wherein: the catalyst has a honeycomb portion, and an outer cylinder portion with which the honeycomb portion is covered; the honeycomb portion is divided into a plurality of parts inside the outer cylinder portion; and the downstream sensor is arranged among the plurality of divided parts of the honeycomb portion. According to the configuration, the downstream sensor is arranged among the plurality of divided parts of the honeycomb portion. Accordingly, it is unnecessary to arrange the downstream sensor in the chamber. As a result, the downstream sensor can be arranged closely to the catalyst without largely changing an existing configuration. In addition, when the size of the catalyst has to be increased, the catalyst can be divided into a plurality. Accordingly, the size of each catalyst can be reduced so that the degree of freedom for a catalyst layout can be enhanced.

It is preferable that the exhaust gas sensor arrangement structure according to the invention further comprises: a chamber which is connected to the downstream side of the catalyst; wherein: the catalyst has a first catalyst which is arranged in front of the chamber and under the engine, and a second catalyst which is arranged inside the chamber; and the downstream sensor is arranged between the first catalyst and the second catalyst. According to the configuration, the downstream sensor is arranged between the first catalyst and the second catalyst. Accordingly, it is unnecessary to arrange the downstream sensor in the chamber. As a result, the downstream sensor can be arranged closely to the catalyst without largely changing an existing configuration. In addition, the catalyst can be divided into a plurality. Accordingly, the size of each catalyst can be reduced so that the degree of freedom for a catalyst layout can be enhanced.

According to the invention, it is possible to arrange the exhaust gas sensors before and behind the catalyst without spoiling detection accuracy.

Figure 1:
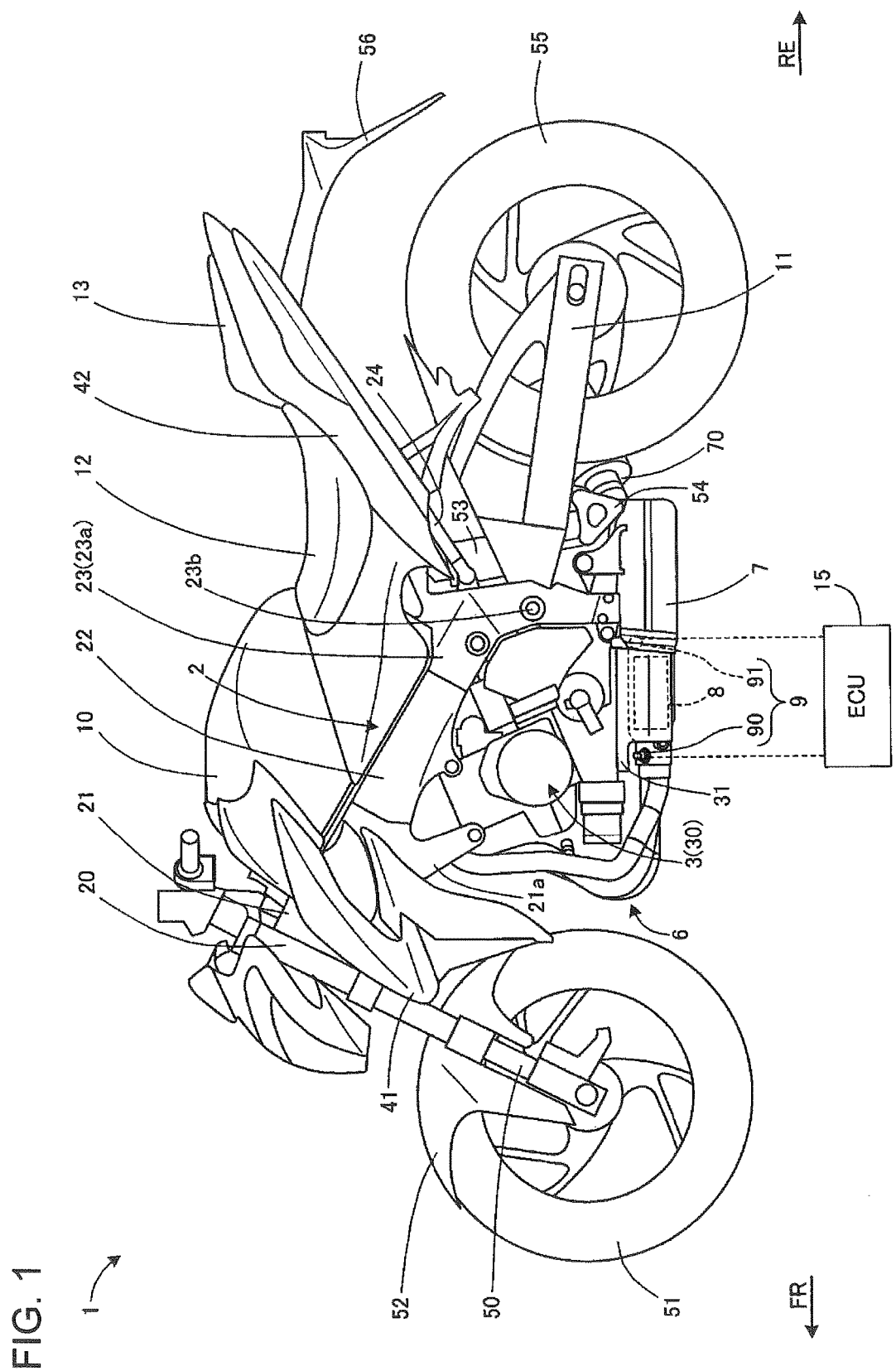
FIG. 1 is a left side view showing a schematic configuration of a motorcycle to which an exhaust gas sensor arrangement structure according to an embodiment of the invention is applied.

REFERENCE SIGNS LIST 1 motorcycle
3 engine
30 engine casing
31 oil pan
31a recess portion of oil pan
61a exhaust control valve
8 catalyst
8a, 303, 304, 405, 407 honeycomb portion
8b, 302, 406, 408 outer cylinder portion
80, 305, 403 catalyst casing
9 exhaust gas sensor
90 upstream sensor
91 downstream sensor
7, 306, 404 chamber
74 recess portion of chamber
104 guidance pipe
105, 205 front wall portion (outer wall)
204 guidance wall
401 sub catalyst (first catalyst)
402 main catalyst (second catalyst)

DETAILED DESCRIPTION OF THE INVENTION

An embodiment of the invention will be described below in detail with reference to the accompanying drawings. Incidentally, an example in which an exhaust gas sensor arrangement structure according to the invention is applied to a sport-type motorcycle will be described below. However, the subject to which the exhaust gas sensor arrangement structure according to the invention is applied is not limited thereto but can be changed. For example, the exhaust gas sensor arrangement structure according to the invention may be applied to another type motorcycle, a buggy-type three-wheeled automobile, a buggy-type four-wheeled automobile, etc. In addition, as to directions, a front of the vehicle will be designated by an arrow FR, and a rear of the vehicle will be designated by an arrow RE, respectively. In addition, a configuration will be partially omitted from each of the following drawings for convenience of explanation.

Figure 2:
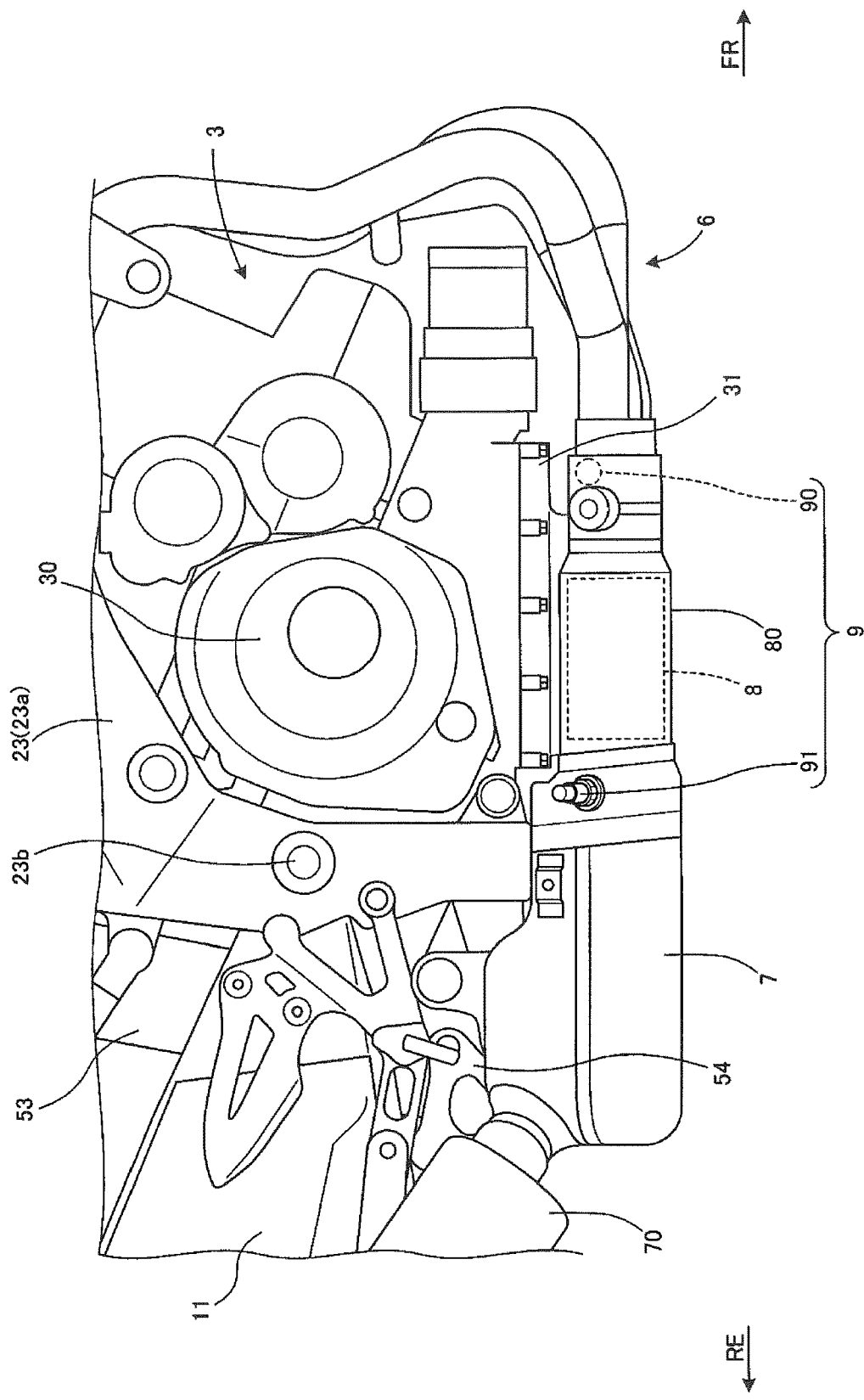
FIG. 2 is a right side view showing the schematic configuration of the motorcycle to which the exhaust gas sensor arrangement structure according to the embodiment is applied.

A schematic configuration of a motorcycle to which the exhaust gas sensor arrangement structure according to the embodiment is applied will be described with reference to FIG. 1 and FIG. 2. FIG. 1 is a left side view showing the schematic configuration of the motorcycle to which the exhaust gas sensor arrangement structure according to the embodiment is applied. FIG. 2 is a right side view showing the schematic configuration of the motorcycle to which the exhaust gas sensor arrangement structure according to the embodiment is applied.

As shown in FIG. 1 and FIG. 2, the motorcycle 1 has a configuration in which an engine 3 is suspended on a vehicle body frame 2 on which respective portions of a power unit, an electric system etc. are mounted. The engine 3 is, for example, constituted by a parallel four-cylinder engine. The engine 3 has a configuration in which a cylinder head and a cylinder head cover (not shown) are attached to an upper portion of an engine casing 30 in which a crankshaft (not shown) etc. is received. An oil pan 31 is provided in a lower portion of the engine casing 30.

The vehicle body frame 2 is a twin-spar-type frame which is formed by aluminum casting. The vehicle body frame 2 is configured to suspend the engine 3 as described above so that rigidity as an entire vehicle body can be obtained. The vehicle body frame 2 as a whole has a shape extending from the front toward the rear and curved downward at a rear end side.

Specifically, the vehicle body frame 2 has a head frame 21, a pair of left and right tank rails 22, and a body frame 23. The head frame 21 extends rearward from a head pipe 20 and branches into two, left and right parts. The pair of tank rails 22 extend obliquely downward from the head frame 21 toward the rear of the vehicle body. The body frame 23 extends downward from rear ends of the tank rails 22.

The head frame 21 has a pair of left and right bracket portions 21a protruding downward. The head frame 21 supports a front side (the cylinder head) of the engine 3 on the bracket portions 21a. Each of the tank rails 22 is formed into a cylindrical shape having a hollow shape in section. A fuel tank 10 is arranged on upper portions of the tank rails 22.

The body frame 23 has a configuration in which upper and lower end portions of a pair of frame portions 23a extending downward from the rear ends of the tank rails 22 respectively are connected to each other in a vehicle width direction respectively. A rear side of the engine 3 (a rear portion of the engine casing 30) is supported on the upper and lower end portions of the body frame 23. In addition, a swing arm pivot 23b supporting a swing arm 11 swingably is formed substantially at a vertically central portion of the body frame 23.

In addition, a seat rail (not shown) and a back stay 24 which extend rearward and upward are provided at an upper end of the body frame 23. A rider seat 12 and a pillion seat 13 which are connected to the fuel tank 10 are provided in the seat rail.

Various covers serving as vehicle body exteriors are mounted on the vehicle body frame 2 and the engine 3 which are configured thus. Specifically, a side face of the vehicle body is covered with a side cowl 41 and the seat rail is covered with a rear cowl 42.

A pair of left and right front forks 50 are supported steerably on the head pipe 20 through a steering shaft (not shown). A front wheel 51 is supported rotatably on lower portions of the front forks 50. An upper part of the front wheel 51 is covered with a front fender 52.

The swing arm 11 extends rearward from the swing arm pivot 23b. A rear suspension 53 is provided between the swing arm 11 and the body frame 23. One end of the rear suspension 53 is supported on the upper end side of the body frame 23. The other end of the rear suspension 53 is supported on a lower front side of the swing arm 11 through a rear suspension link 54. A rear wheel 55 is rotatably supported on a rear end of the swing arm 11. An upper part of the rear wheel 55 is covered with a rear fender 56. The rear fender 56 is provided at a rear portion of the rear cowl 42.

In addition, exhaust pipes 6, a chamber 7 and a muffler 70 are connected as an exhaust system to respective exhaust ports of the cylinder head. After the plurality of (four in the embodiment) exhaust pipes 6 extend downward from the respective exhaust ports and are bent rearward at a lower front side of the engine 3, the exhaust pipes 6 are combined into one. A catalyst 8 purifying exhaust gas is provided between the exhaust pipes 6 and the chamber 7.

The catalyst 8 is, for example, constituted by a three-way catalyst, and received in a cylindrical catalyst casing 80 (see FIG. 2). The catalyst 8 converts a contaminant in exhaust gas (carbon monoxide, hydrocarbon, nitrogen oxide, etc.) into a decontaminated substance carbon dioxide, water, nitrogen, etc.). The muffler 70 is connected to a downstream side of the catalyst 8 through the chamber 7. Exhaust gas generated due to combustion of the engine 3 is purified by the catalyst 8 through the exhaust pipes 6. The exhaust gas is discharged to the outside after exhaust sound is reduced by the muffler 70 through the chamber 7.

Although details will be described later, exhaust gas sensors 9 for detecting an exhaust gas component of the engine and determining whether the catalyst 8 is deteriorated or not are arranged before and behind the catalyst 8. Specifically, the exhaust gas sensors 9 include an upstream sensor 90 provided at a front side (upstream side) of the catalyst 8, and a downstream sensor 91 provided at a rear side (downstream side) of the catalyst 8. Each of the exhaust gas sensors 9 is, for example, constituted by a zirconia type oxygen sensor whose output (current value) changes in accordance with an oxygen concentration in the exhaust gas. The current value is outputted to an ECU 15 (Electronic Control Unit). Incidentally, the exhaust gas sensor 9 is not limited to the oxygen sensor, but may be, for example, an air-fuel-ratio sensor.

The ECU 15 integrally controls various operations inside the motorcycle 1. The ECU 15 is constituted by a processor, a memory, etc. for executing various processes inside the motorcycle 1. The memory is constituted by a storage medium such as an ROM (Read Only Memory) or an RAM (Random Access Memory) in accordance with a purpose. A control program etc. which controls respective portions of the motorcycle 1 is stored in the memory. Particularly in the embodiment, the ECU 15 determines whether the catalyst 8 is deteriorated or not, based on the outputs of the exhaust gas sensors 9. For example, determination as to whether the catalyst 8 is deteriorated or not is made based on a ratio between numbers of times of output inversions between a lean state and a rich state in the upstream sensor 90 and the downstream sensor 91. Incidentally, in order to determine whether the catalyst 8 is deteriorated or not, the ratio between the numbers of times of output inversion does not have to be always used but a difference between the outputs of the upstream sensor 90 and the downstream sensor 91 may be used alternatively.

As described above, recent exhaust gas regulation requires the exhaust system of the motorcycle to monitor a deterioration condition of the catalyst serving as an exhaust gas purifying device. It is necessary to place exhaust gas sensors at the upstream and downstream sides of the catalyst respectively in order to determine whether the catalyst is deteriorated or not.

For example, according to the background art, an oxygen concentration in exhaust gas is detected by an exhaust gas sensor (oxygen sensor) provided at an upstream side of a catalyst to thereby control an air-fuel ratio. However, when another exhaust gas sensor is also intended to be placed at a downstream side of the catalyst in order to determine whether the catalyst is deteriorated or not, restrictions on a layout peculiar to a motorcycle makes it difficult to place the exhaust gas sensor closely to the downstream side of the catalyst while securing predetermined detection accuracy.

In this respect, in a four-wheeled automobile, exhaust gas sensors can be arranged and protected easily because a catalyst can be arranged at a place having an enough space, such as the inside of an engine room. On the other hand, in a motorcycle, a catalyst is often arranged inside a chamber or a muffler. It is therefore structurally difficult to arrange a downstream sensor closely to the catalyst. In addition, even when the catalyst is arranged in the middle of an exhaust pipe, the exhaust pipe is often adjacent to peripheral components. It is therefore difficult to secure a space in which exhaust gas sensors can be arranged. Further, an exhaust system of the motorcycle is exposed to the outside. Therefore, it may be also supposed that sensor outputs cannot be obtained properly, for example, during travelling in a winter season or in rainy weather when temperature of the catalyst is apt to decrease. In addition, there may also arise a problem as to protection of the exhaust gas sensors.

When, for example, the catalyst is provided inside the chamber or the muffler, it may be considered that an outer wall of the chamber or the muffler is recessed to secure an arrangement space for the exhaust gas sensors. However, there is a fear that the original function (an engine output increase or muffling) of the chamber or the muffler may be affected as a result of reduction in the volume of the chamber or the muffler. In addition, it may be also considered that the catalyst per se is arranged at the front side of the vehicle. However, it is essentially difficult to secure the arrangement space for the catalyst. In addition, it is necessary to change the design greatly. Therefore, this idea is not very realistic. Further, there may arise various problems such as heat damage due to the catalyst placed as a heat source closely to a rider, lowering of the engine outputs, a method for protecting the exhaust gas sensors, and deterioration of appearance design.

To solve these problems, the present inventors have focused on a limited space under the engine 3 in the sport-type motorcycle 1 and arrived at the invention. Specifically, in the embodiment, the catalyst 8 is arranged under the engine casing 30 (oil pan 31), and the two exhaust gas sensors 9 (the upstream sensor 90 and the downstream sensor 91) are arranged so that the catalyst 8 is provided between the exhaust gas sensors 9 at the front and rear sides of the catalyst 8.

According to the configuration, the catalyst 8 is arranged under the engine 3. Thus, the exhaust gas sensors 9 can be arranged closely to the catalyst 8 before and behind the catalyst 8. Particularly, the downstream sensor 91 is arranged in a relatively ample space under the engine 3 so that the downstream sensor 91 can be placed closely to the catalyst 8. When the downstream sensor 91 is arranged immediately after the catalyst 8, purified exhaust gas is not diffused but directly touches the downstream sensor 91. As a result, sensor outputs can be obtained stably so that detection accuracy of the exhaust gas sensors 9 can be prevented from being spoiled. When the space under the engine 3 is used effectively in this manner, the exhaust gas sensors 9 can be arranged without requiring any great design change and without affecting the appearance design. Further, when the catalyst 8 is provided closely to the engine 3, it is possible to suppress a drop in the temperature of the catalyst 8 so that it is possible to suppress deterioration in the exhaust gas purification effect or influence on the sensor outputs.

Figure 3:
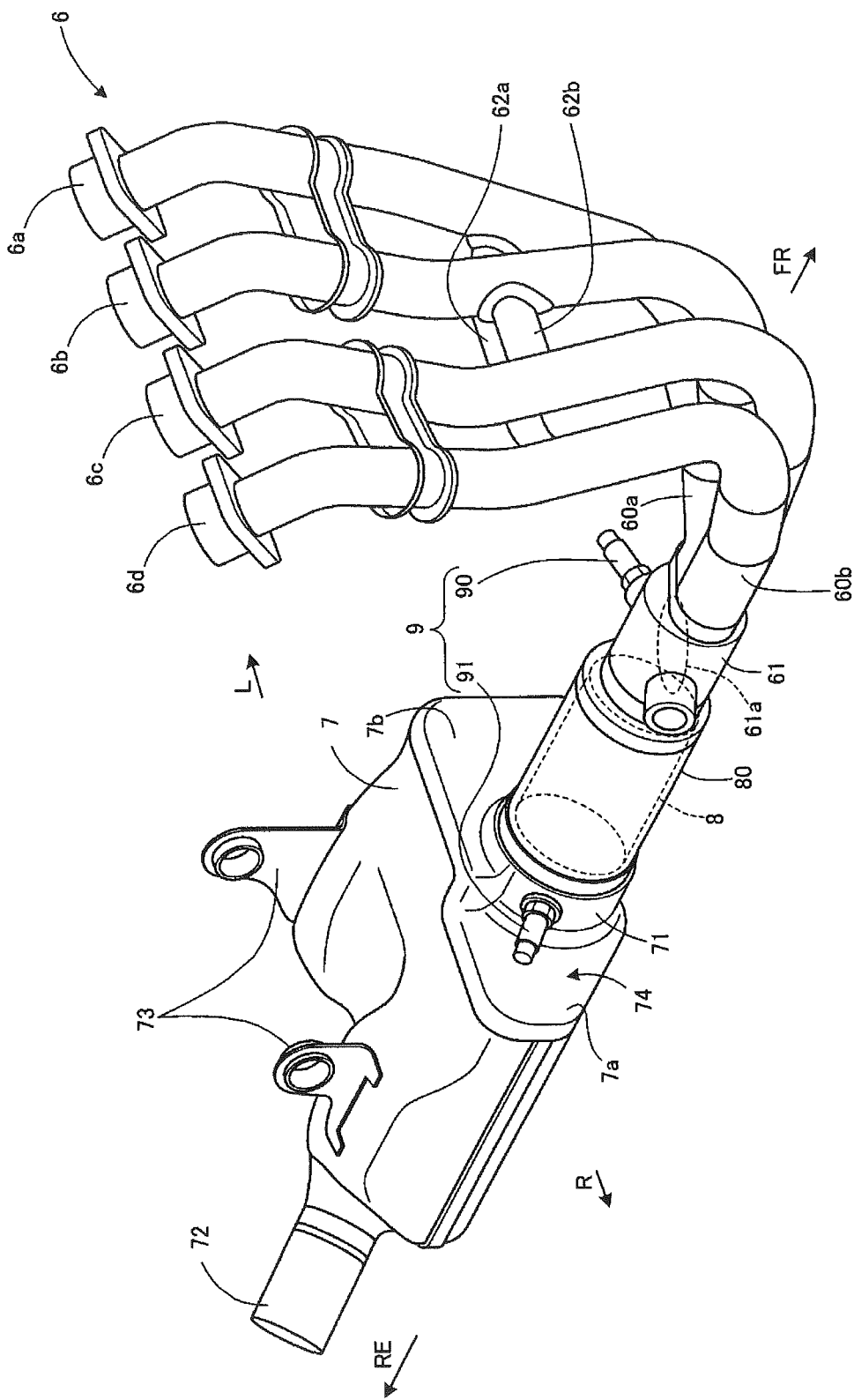
FIG. 3 is a perspective view showing an exhaust system according to the embodiment.
Figure 4:
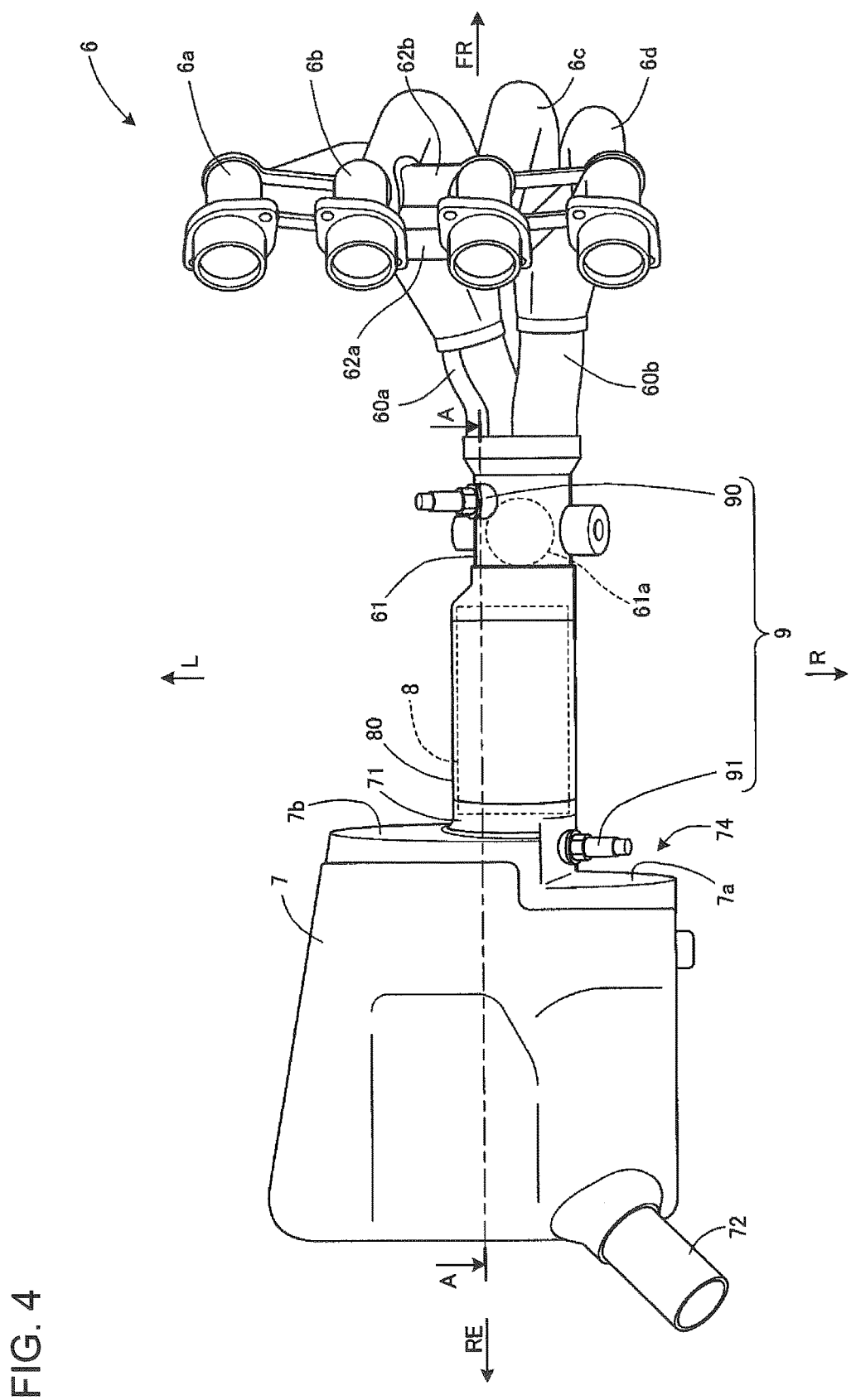
FIG. 4 is a top view showing the exhaust system according to the embodiment.

Next, the exhaust system according to the embodiment will be described in detail with reference to FIG. 3 and FIG. 4. FIG. 3 is a perspective view showing the exhaust system according to the embodiment. FIG. 4 is a top view showing the exhaust system according to the embodiment.

As shown in FIG. 3 and FIG. 4, in the exhaust system according to the embodiment, the exhaust pipes 6 have a configuration in which exhaust pipes 6a to 6d extending downward from the respective exhaust ports of the cylinder head are combined into one by first aggregate pipes 60a and 60b and a second aggregate pipe 61. Specifically, as shown in FIG. 4, the exhaust pipes 6a, 6b, 6c and 6d are illustrated in the named order from a left side in the vehicle width direction. The exhaust pipes 6a and 6d at outer sides in the vehicle width direction are connected to each other by a connection pipe 62a extending in the vehicle width direction. The exhaust pipes 6b and 6c at inner sides in the vehicle width direction are connected to each other by a connection pipe 62b extending in the vehicle width direction.

The four exhaust pipes 6a to 6d are bent rearward at a lower front side of the engine casing 30. The two exhaust pipes 6a and 6b at the left side are connected to the first aggregate pipe 60a to be combined into one. The two exhaust pipes 6c and 6d at the right side are connected to the first aggregate pipe 60b to be combined into one. The first aggregate pipes 60a and 60b extend rearward respectively to be connected to the second aggregate pipe 61 to be combined into one.

The second aggregate pipe 61 extends rearward. An exhaust control valve 61a for adjusting a flow rate of exhaust gas is provided internally in the second aggregate pipe 61. The exhaust control valve 61a is positioned at a downstream side of the second aggregate pipe 61. The exhaust control valve 61a is, for example, constituted by a butterfly valve which increases or reduces a sectional area of a flow channel of the second aggregate pipe 61 to thereby adjust the flow rate of the exhaust gas. The catalyst 8 received in the catalyst casing 80 is connected to a rear end of the second aggregate pipe 61. The chamber 7 is connected to a rear end of the catalyst casing 80.

As described above, the exhaust gas sensors 9 are arranged before and behind the catalyst 8. Each of the exhaust gas sensors 9 is formed into a columnar shape having a predetermined length. One end side of the exhaust gas sensor 9 serves as a detection portion, and a wiring (not shown) is connected to the other end side of the exhaust gas sensor 9. Specifically, the upstream sensor 90 is attached at an upstream side of the second aggregate pipe 61 so that the one end side of the upstream sensor 90 penetrates the second aggregate pipe 61. The upstream sensor 90 is attached in front of the exhaust control valve 61a closely to the left side with respect to a central axis of the second aggregate pipe 61. The other end side of the upstream sensor 90 is directed toward an upper left side.

The downstream sensor 91 is attached to a connection portion between the catalyst casing 80 and the chamber 7 (a connection port 71 which will be described later) immediately after the catalyst 8. Although details will be described later, one end side of the downstream sensor 91 is attached to penetrate the chamber 7 (the connection port 71) and a portion (an outer cylinder portion 8b (see FIG. 5)) of the catalyst 8. The downstream sensor 91 is attached closely to the right side with respect to the central axis of the catalyst 8 (the catalyst casing 80). The other end side of the downstream sensor 91 is directed toward an upper right side.

Particularly, in the embodiment, the upstream sensor 90, the exhaust control valve 61a, the catalyst 8 and the downstream sensor 91 are arranged side by side substantially on the same straight line. Therefore, the aforementioned configuration can be arranged without increasing a dimension in the vehicle width direction. In addition, even when the exhaust control valve 61a is provided, the catalyst 8 and the downstream sensor 91 can be arranged closely to each other.

The chamber 7 is formed into a box shape having a predetermined expansion chamber. Specifically, the chamber 7 is formed to have a larger width in a front/rear direction and a larger width in a left/right direction than a width in an up/down direction. Thus, the chamber 7 is configured substantially as a rectangular parallelepiped having rectangular shapes in a front view and a side view. The chamber 7 is formed in such a manner that, for example, an upper half portion opened at the lower side and a lower half portion opened at the upper side are welded to each other. The connection port 71 for making connection to the catalyst casing 80 is formed at a front face of the chamber 7. The connection port 71 is formed substantially at a left/right-direction central portion in the front face of the chamber 7 and has a circularly cylindrical shape corresponding to an outer diameter of the catalyst casing 80.

A connection pipe 72 for making connection to the muffler 70 is provided at a right rear corner portion of the chamber 7. The connection pipe 72 communicates with an internal space (a downstream space which will be described later) of the chamber 7. A downstream end of the connection pipe 72 is directed toward a right rear upper side. A pair of brackets 73 (not shown in FIG. 4) for fixing the chamber 7 to the vehicle body side (the body frame 23 (see FIG. 1)) are provided on an upper face of the chamber 7.

In addition, a recess portion 74 is formed at a right front corner portion of the chamber 7. The recess portion 74 is formed with a size large enough to receive the downstream sensor 91 therein. The right front of the chamber 7 is recessed slightly rearward. Thus, a front wall portion 7a at a right side of the catalyst casing 80 is positioned rearward of a front wall portion 7b located at a left side of the catalyst casing 80. Although details will be described later, an arrangement space for the downstream sensor 91 can be secured due to the recess portion 74.

Figure 5:
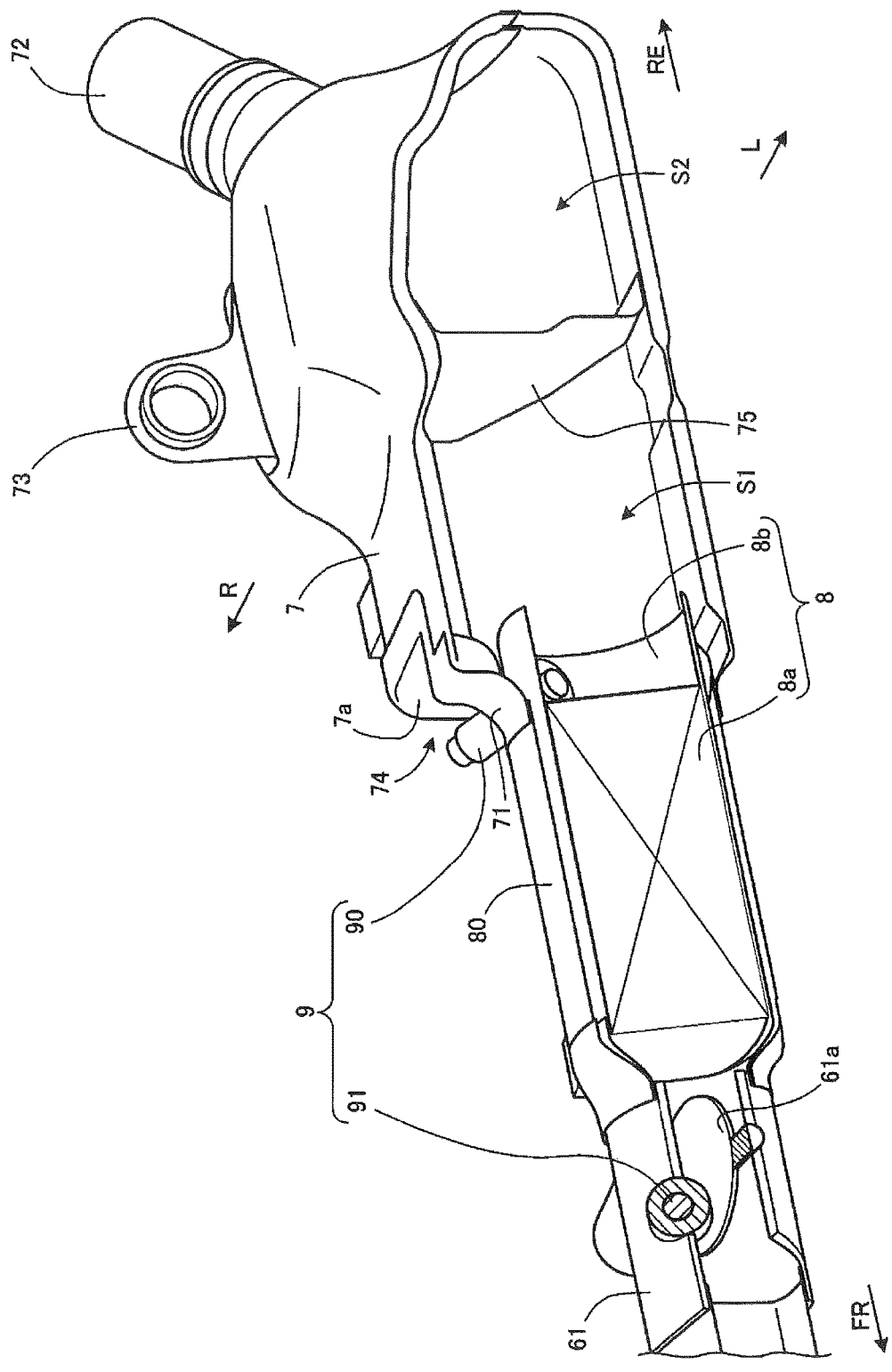
FIG. 5 is a sectional view taken along a line A-A of FIG. 4.
Figure 6:
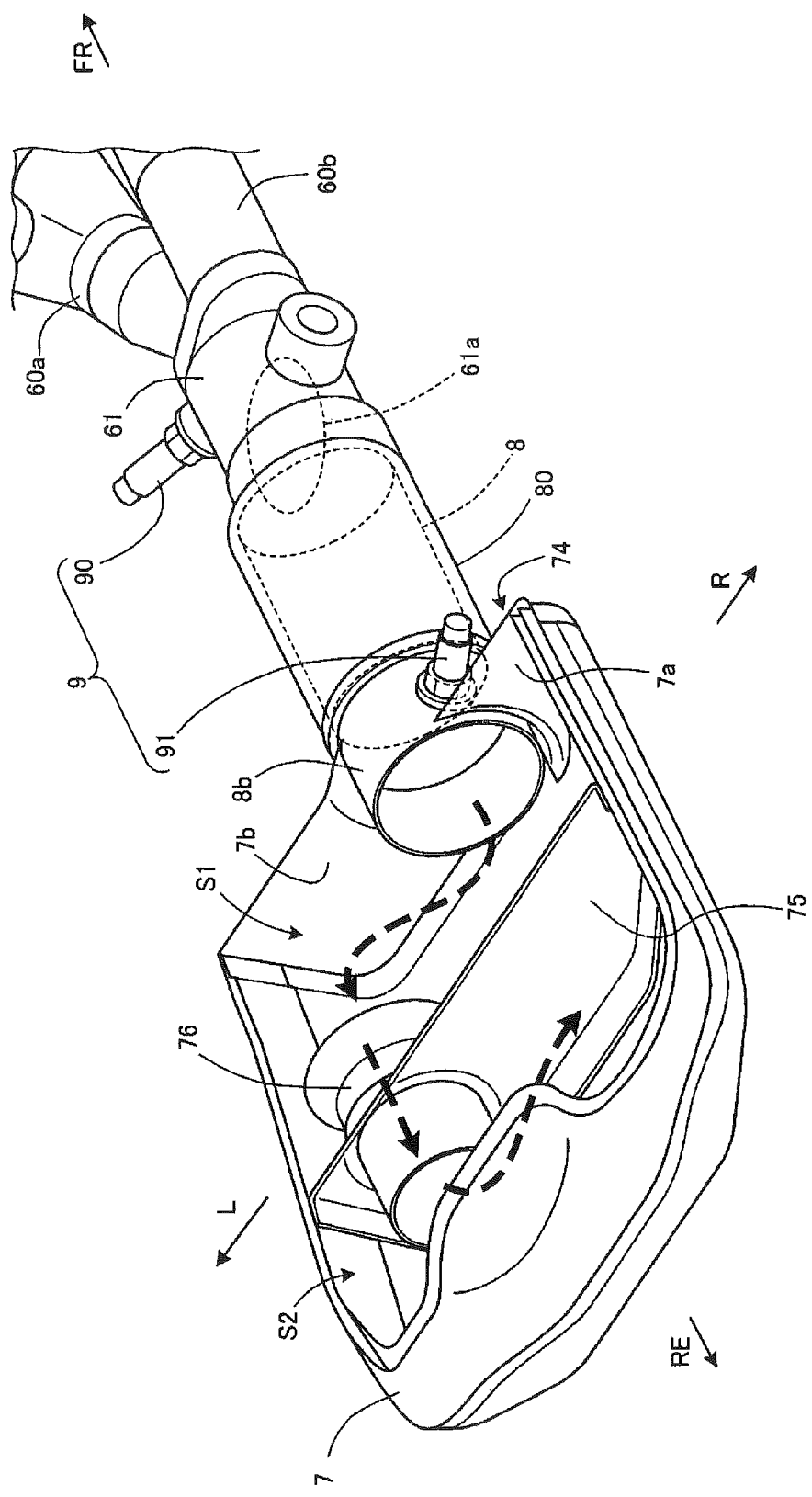
FIG. 6 is a perspective view when a portion of a chamber according to the embodiment is cut away.
Figure 7:
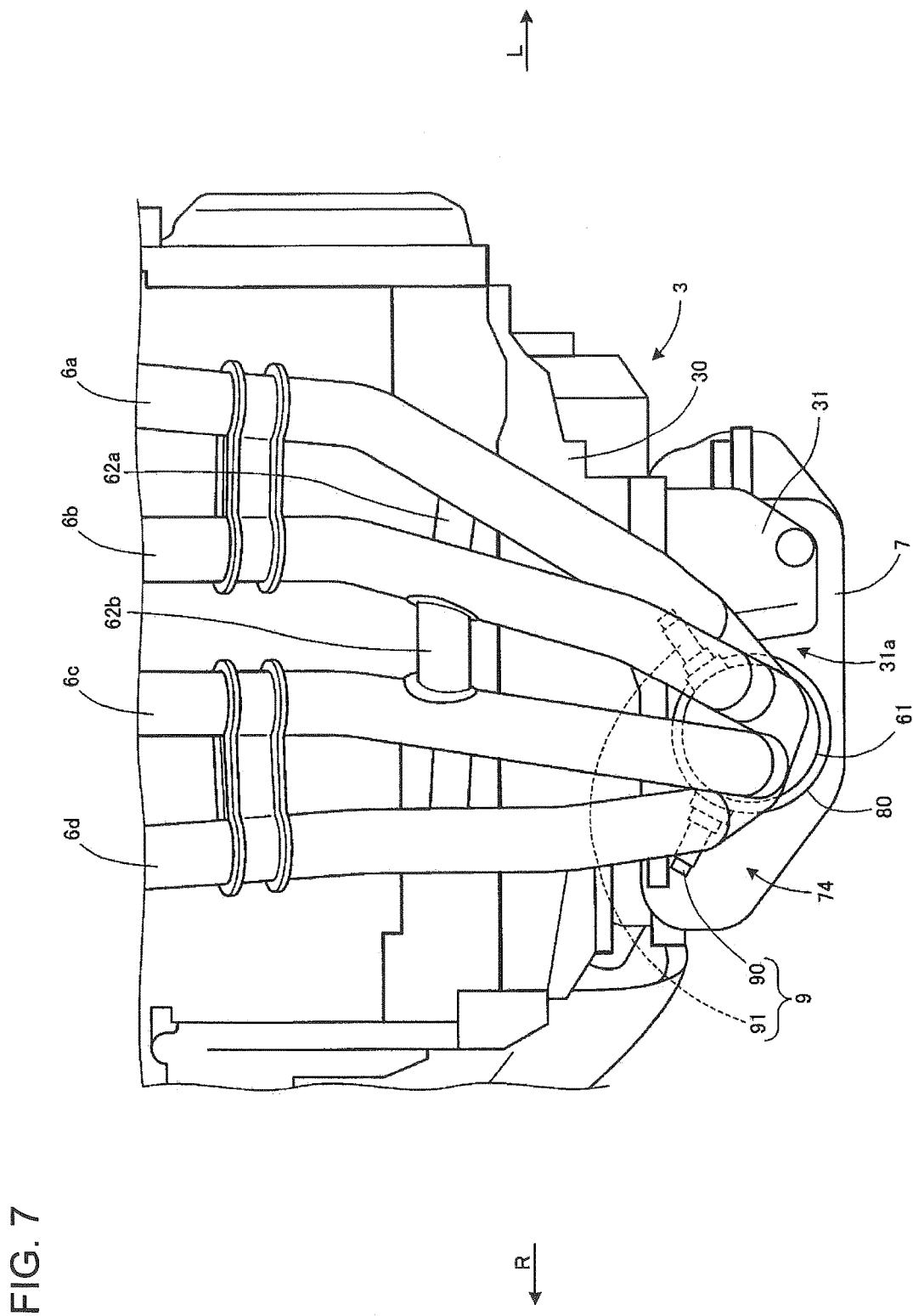
FIG. 7 is a front view showing a peripheral configuration of exhaust pipes according to the embodiment.

Next, the layout of the catalyst, the chamber and the exhaust gas sensors according to the embodiment will be described with reference to FIGS. 3 to 7. FIG. 5 is a sectional view taken along a line A-A of FIG. 4. FIG. 6 is a perspective view when a portion (an upper half portion) of the chamber according to the embodiment is cut away. FIG. 7 is a front view showing a peripheral configuration of the exhaust pipes according to the embodiment. Incidentally, in the sectional view shown in FIG. 5, a section as to a configuration of a pipe etc. having a relatively small thickness is indicated by a line for convenience's sake.

As shown in FIG. 5 and FIG. 6, the catalyst 8 has a columnar honeycomb portion 8a which adsorbs a predetermined component in exhaust gas, and an outer cylinder portion 8b with which the honeycomb portion 8a is covered. The honeycomb portion 8a has a length corresponding to the catalyst casing 80. On the other hand, the outer cylinder portion 8b shaped like a circular cylinder extends up to the inside of the chamber 7 at a downstream side of the honeycomb portion 8a. Specifically, a rear end of the outer cylinder portion 8b extends rearward of the front wall portion 7a located at the right side.

A partition wall 75 for partitioning the internal space into a front part and a rear part is provided inside the chamber 7. The partition wall 75 is formed substantially in the front/rear-direction center of the chamber 7 so as to extend in the left/right direction. The internal space of the chamber 7 is divided into a front upstream space S1 and a rear downstream space S2 by the partition wall 75.

A communication pipe 76 for communicating the upstream space S1 and the downstream space S2 with each other is provided in the partition wall 75. The communication pipe 76 is formed to extend in the front/rear direction to penetrate the partition wall 75 at the left side. An upstream end of the communication pipe 76 is enlarged in diameter. Exhaust gas flowing from the catalyst casing 80 is introduced into the communication pipe 76 easily.

The exhaust gas purified by the catalyst 8 flows into the upstream space S1 of the chamber 7 through the outer cylinder portion 8b. On this occasion, a sectional area of a flow channel of the exhaust gas becomes large suddenly. Therefore a flow rate of the exhaust gas is dropped suddenly. The flow channel of the exhaust gas is bent leftward while colliding against an inner wall in the upstream space S1. Then, the exhaust gas flows into the rear downstream space S2 through the communication pipe 76. The flow channel of the exhaust gas is bent rightward while colliding against an inner wall in the downstream space S2. Then, the exhaust gas flows into the muffler 70 through the connection pipe 72.

In the embodiment, the recess portion 74 is formed in the front face of the chamber 7, as described above. The downstream end of the catalyst 8 is connected to the vicinity of the recess portion 74. In addition, the downstream sensor 91 is attached from the right side to penetrate the connection port 71 and the outer cylinder portion 8b so that the downstream sensor 91 is received in the recess portion 74. As a result, even when the chamber 7 is connected to the downstream side of the catalyst 8, the downstream sensor 91 can be arranged closely immediately after the catalyst 8. Accordingly, the exhaust gas which has been passed through the honeycomb portion 8a and purified thereby can touch the downstream sensor 91 suitably.

Particularly, the outer cylinder portion 8b extends up to the inside of the chamber 7 at a downstream side of the honeycomb portion 8a. The downstream sensor 91 is attached to a downstream end of the outer cylinder portion 8b inside the chamber 7. Therefore, the exhaust gas can touch the downstream sensor 91 before being diffused into the chamber 7. That is, the exhaust gas is guided to the downstream sensor 91 by the outer cylinder portion 8b. Accordingly, the exhaust gas can be made to touch the downstream sensor 91 in a fixed flow so that a sensor output can be obtained stably.

Further, the downstream end of the outer cylinder portion 8b extends rearward of the front wall portion 7a at the right side of the chamber 7. Therefore, even when the recess portion 74 is provided in the chamber 7, reduction of the volume of the chamber 7 can be suppressed to the minimum so as not to affect the original function of the chamber 7.

In addition, as shown in FIG. 7, the oil pan 31 has a recess portion 31a in the right at the lower side of the engine casing 30. The catalyst 8 is provided to extend along the recess portion 31a. In addition, the catalyst 8 (catalyst casing 80) has substantially the same size as a width of the oil pan 31 in the front/rear direction. The oil pan 31 is positioned between the upstream sensor 90 and the downstream sensor 91 before and behind the catalyst 8 in a side view. In this manner, the upstream sensor 90 and the downstream sensor 91 can be arranged without interfering with the oil pan 31 before and behind the catalyst 8. Accordingly, the exhaust gas sensors 9 can be set in a compact layout without increasing the width of the engine 3.

In addition, the exhaust gas sensors 9 are arranged within a width of the chamber 7 or the oil pan 31 in the left/right direction. Thus, the exhaust gas sensors 9 can be put near to the center side of the vehicle so that the exhaust gas sensors 9 can be protected from steppingstones etc. In addition, the other end sides of the exhaust gas sensors 9 can be prevented from protruding in the vehicle width direction from the oil pan 31. Accordingly, the size in the vehicle width direction is not increased due to the exhaust gas sensors 9 so that the appearance can be also suppressed from being affected.

Further, the recess portion 31a is provided closely to one side (the right side) of the oil pan 31 in the vehicle width direction. In this case, the recess portion 31a is put near to the right side. Thus, the oil pan 31 can be formed into a simple shape. Particularly, the recess portion 31a of the oil pan 31 and the recess portion 74 of the chamber 7 are provided at the same side (right side). Thus, it is possible to secure an arrangement space for the catalyst and the exhaust gas sensors 9 while suppressing reduction of the volume of the oil pan 31 to the minimum. Accordingly, it is possible to arrange the catalyst 8 and the downstream sensor 91 closely to each other in a space formed by the recess portions 31a and 74.

Figure 8:
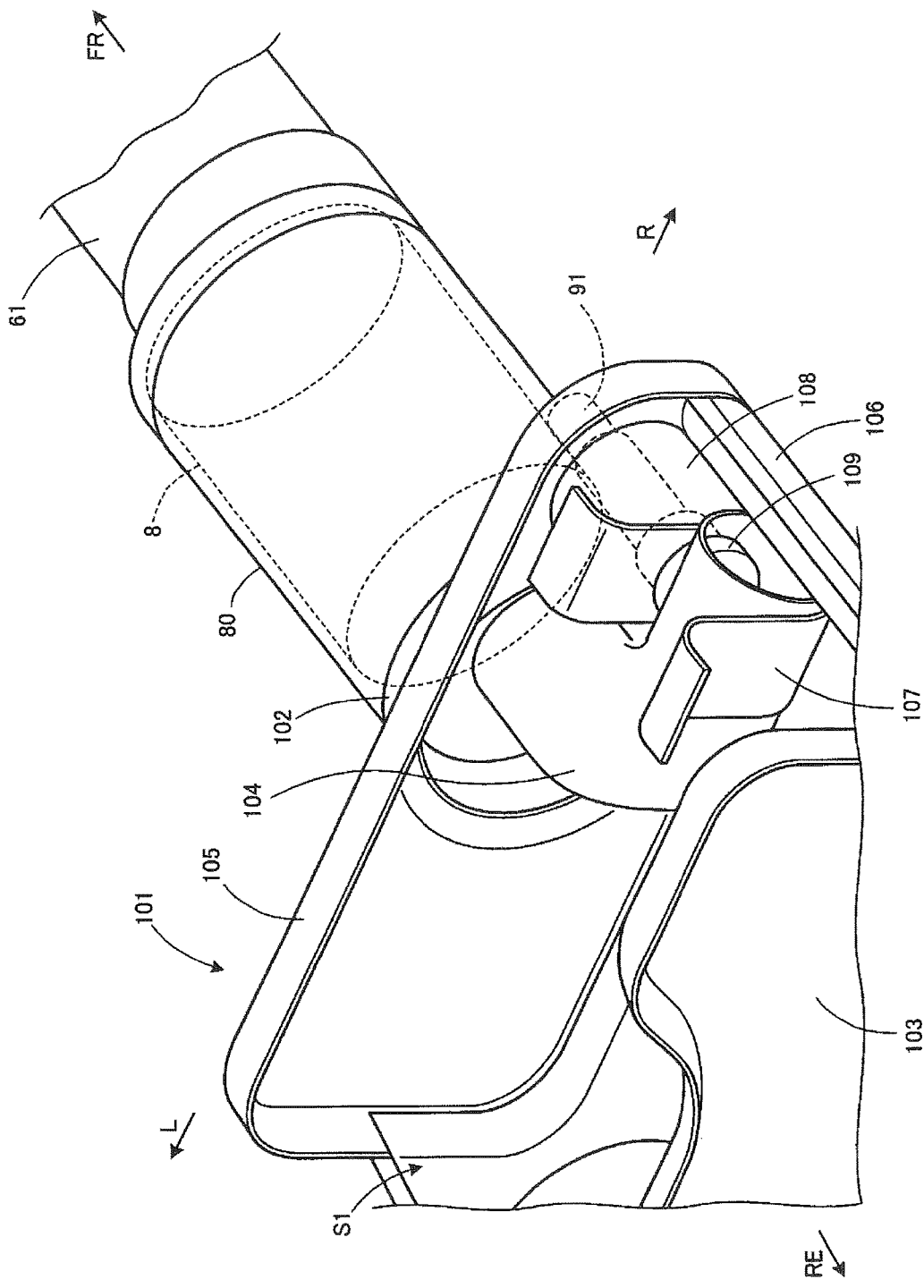
FIG. 8 is a perspective view showing an exhaust gas sensor arrangement structure according to a first modification.
Figure 9:
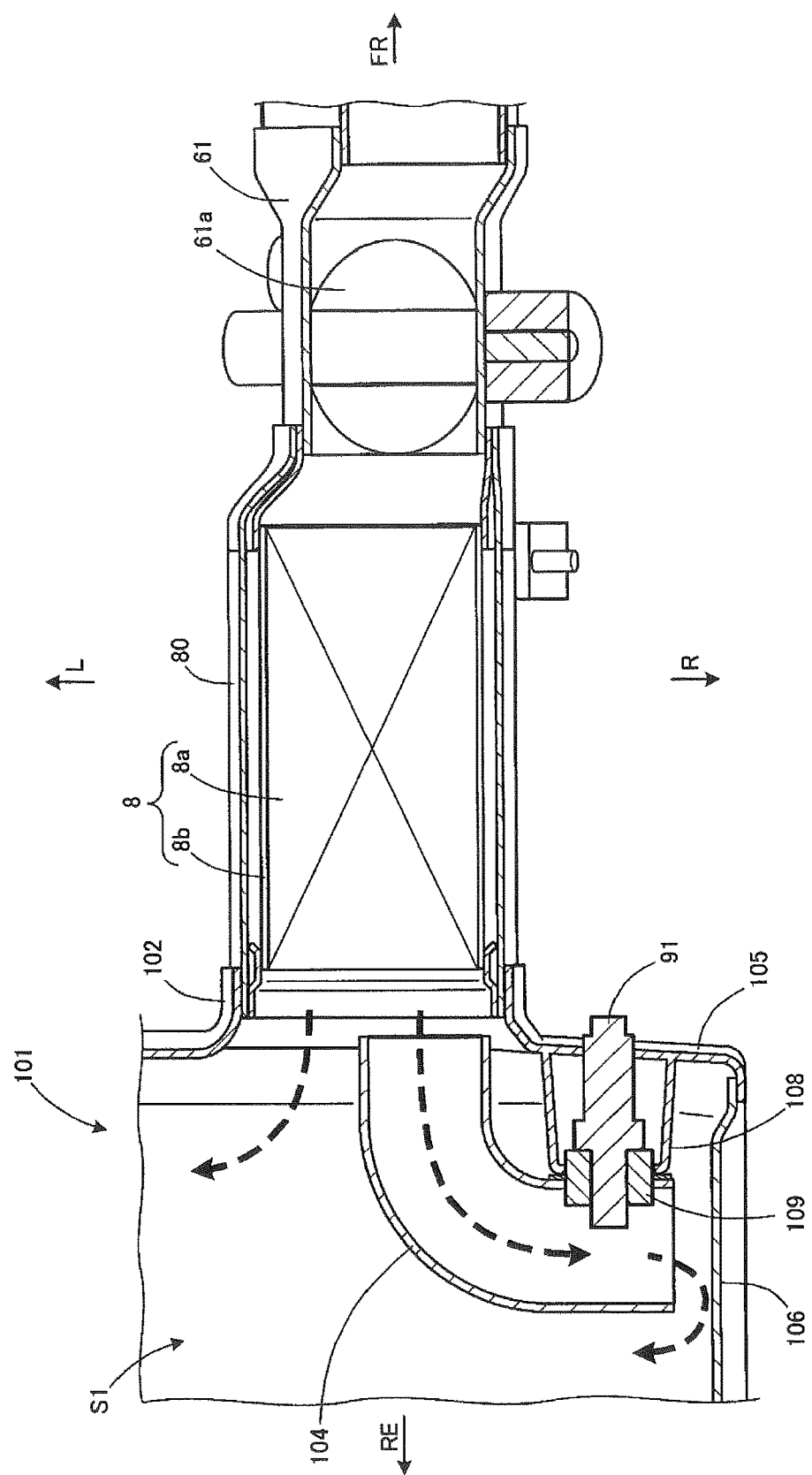
FIG. 9 is a sectional view showing the exhaust gas sensor arrangement structure according to the first modification.

Next, an exhaust gas sensor arrangement structure according to a first modification will be described with reference to FIG. 8 and FIG. 9. FIG. 8 is a perspective view showing the exhaust gas sensor arrangement structure according to the first modification. A portion of an upper half portion of a chamber is omitted from FIG. 8 for convenience of explanation. FIG. 9 is a sectional view showing the exhaust gas sensor arrangement structure according to the first modification. Incidentally, an internal structure of the chamber and an arrangement place of a downstream sensor in the first modification are different from those in the embodiment. Therefore, constituents in common with those in the embodiment in the other configuration than the chamber will be referred to by the same signs correspondingly and respectively, and description thereof will be omitted suitably.

As shown in FIG. 8 and FIG. 9, a chamber 101 according to the first modification is formed into a box shape having a predetermined expansion chamber. A circularly cylindrical connection port 102 is formed substantially in the center of a front face of the chamber 101. A downstream end of a catalyst casing 80 is connected to the connection port 102.

A partition wall 103 for partitioning an internal space into a front part and a rear part is provided in the chamber 101. The internal space of the chamber 101 is divided into a front upstream space S1 and a rear downstream space (not shown) by the partition wall 103. In addition, a communication pipe (not shown) for communicating the upstream space S1 and the downstream space with each other is provided in the partition wall 103.

Particularly, in the first modification, a guidance pipe 104 for guiding exhaust gas which has passed through a catalyst to a downstream sensor 91 is provided in the chamber 101. The guidance pipe 104 is provided to extend along an upstream external wall of the chamber 101, i.e. a front wall portion 105 at a right side of the chamber 101. Specifically, the guidance pipe 104 is formed into a L-shaped pipe in a top view, in which the guidance pipe 104 extends rearward from a downstream end of the catalyst 8 and is then bent rightward in the upstream space S1. An outer diameter of the guidance pipe 104 has a size almost half of an outer diameter of the catalyst casing 80 or the connection port 102.

A front end of the guidance pipe 104 is arranged with a small gap formed with respect to the downstream end of the catalyst casing 80. In addition, the front end of the guidance pipe 104 is arranged to overlap with the connection port 102 in an axial direction. The front end of the guidance pipe 104 is arranged to overlap with the downstream end of the catalyst 8 in a back view. Specifically, the front end of the guidance pipe 104 is arranged slightly closely to the right side within a section of the catalyst 8.

On the other hand, a downstream end of the guidance pipe 104 is opposed to a side wall portion 106 of the chamber 101 and arranged with a small gap formed with respect to the side wall portion 106. The downstream end of the guidance pipe 104 is supported by a support plate 107 which is U-shaped in a side view. Specifically, a lower face of the guidance pipe 104 is supported on a curved face portion of the support plate 107, and a pair of upper end portions of the support plate 107 are fixed to an upper wall portion (not shown) of the chamber 101. Thus, the downstream end of the guidance pipe 104 is supported by the support plate 107.

In the first modification, the downstream sensor 91 is attached to penetrate the guidance pipe 104 and the front wall portion 105. Specifically, an attachment portion 108 for attaching the downstream sensor 91 to the downstream end of the guidance pipe 104 is provided between the downstream end of the guidance pipe 104 and the front wall portion 105 of the chamber 101. The attachment portion 108 is formed as a circularly cylindrical partition wall and extends rearward from an inner face of the front wall portion 105 at the right side of the connection port 102 toward the downstream end of the guidance pipe 104.

Particularly as shown in FIG. 9, a nut portion 109 is welded to a rear end of the attachment portion 108 and a front side portion of the downstream end of the guidance pipe 104. One end side (detection portion) of the downstream sensor 91 is screwed into the nut portion 109. The one end side of the downstream sensor 91 is exposed at an inner face side of the guidance pipe 104. On the other hand, the other end side of the downstream sensor 91 penetrates the front wall portion 105 to be exposed at the front face side. Thus, the downstream sensor 91 is provided to be consistent with the catalyst 8 in the axial direction.

As described above, the downstream sensor 91 is provided so that the guidance pipe 104 extends along an outer wall (the front wall portion 105) of the chamber 101. Thus, the downstream sensor 91 can be arranged in a right front portion of the chamber 101 where a relatively ample space can be secured. Accordingly, the downstream sensor 91 does not overhang from the chamber 101 in a front view of a vehicle but the downstream sensor 91 can be arranged easily without interfering with any other peripheral component. Further, it is possible to arrange the downstream sensor 91 without changing the shape of the chamber 101 and without reducing the volume thereof.

In the chamber 101 configured thus, exhaust gas which has been purified by the catalyst 8 flows directly into the upstream space S1 at a left half portion of the connection port 102 as shown in FIG. 9, when the exhaust gas flows into the chamber 101. On the other hand, the front end of the guidance pipe 104 overlaps with the catalyst 8 at a right half portion of the connection port 102, as described above. Accordingly, a portion of the exhaust gas flows into the guidance pipe 104.

A flow channel for the exhaust gas which has flowed into the guidance pipe 104 is bent rightward along the guide pipe 104. As a result, the exhaust gas touches the downstream sensor 91. The exhaust gas collides against the side wall portion 106 to flow into the upstream space S1. When a portion of the exhaust gas is guided thus to the downstream sensor 91 by the guidance pipe 104, the exhaust gas is not diffused inside the chamber 101 so that a sensor output can be obtained stably. In addition, it is possible to improve the degree of freedom for arranging the downstream sensor 91 in accordance with the shape of the guidance pipe 104.

Figure 10:
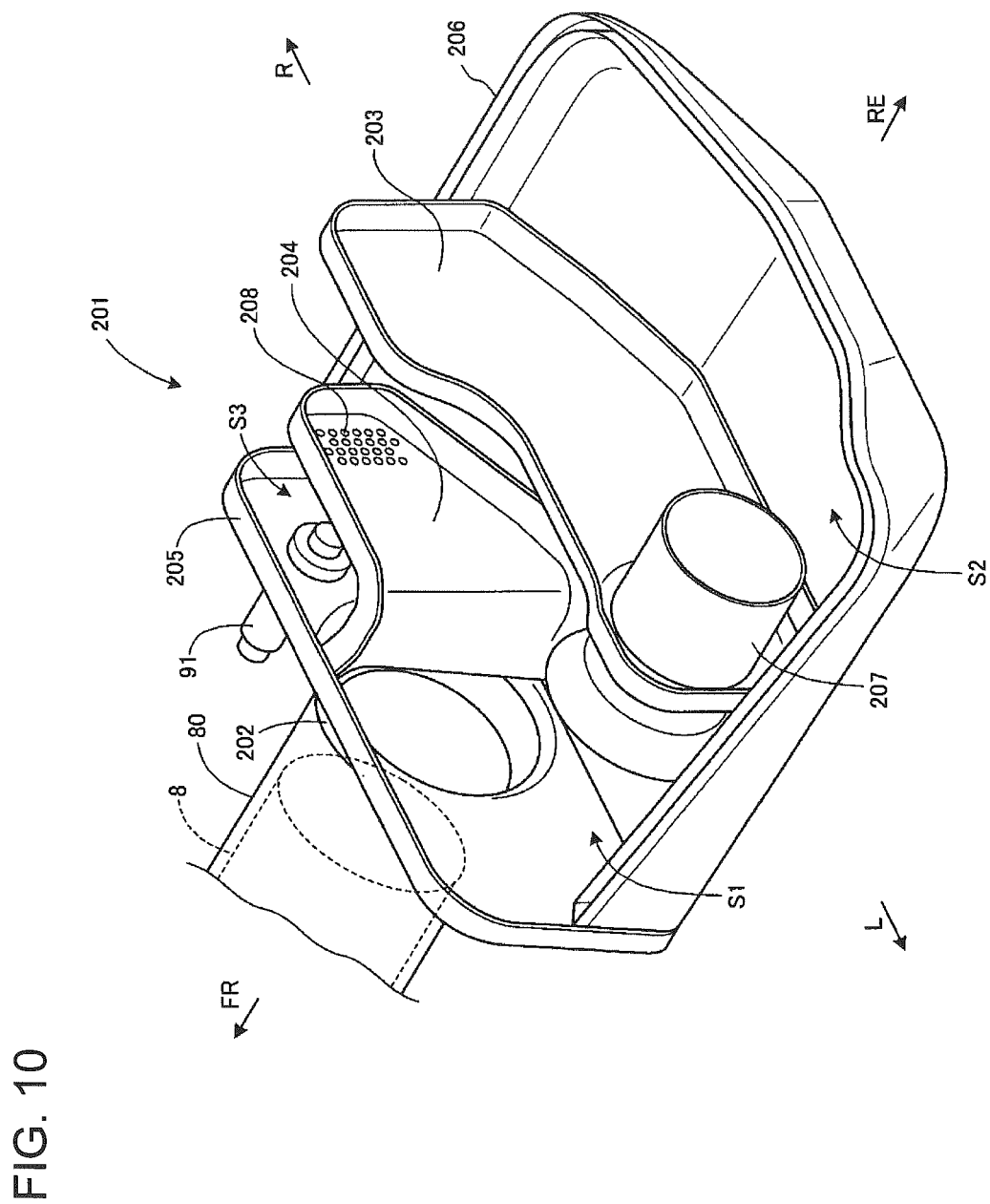
FIG. 10 is a perspective view showing an exhaust gas sensor arrangement structure according to a second modification.
Figure 11:
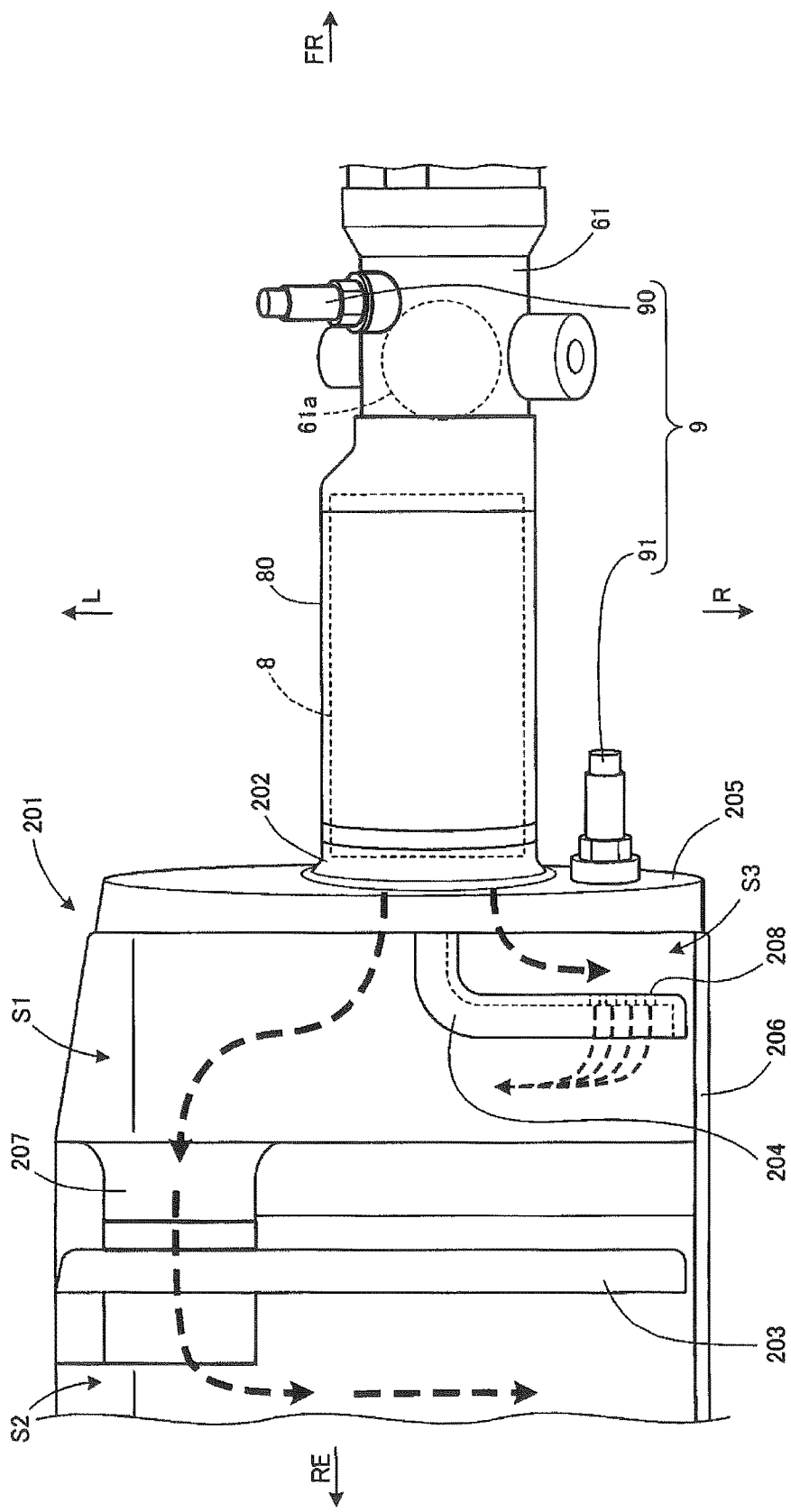
FIG. 11 is a top view showing the exhaust gas sensor arrangement structure according to the second modification.

Next, an exhaust gas sensor arrangement structure according to a second modification will be described with reference to FIG. 10 and FIG. 11. FIG. 10 is a perspective view showing the exhaust gas sensor arrangement structure according to the second modification. FIG. 11 is a top view showing the exhaust gas sensor arrangement structure according to the second modification. An upper half portion of a chamber is omitted from FIG. 10 and FIG. 11 for convenience of explanation. Incidentally, the second modification is different from the first modification in a point that the guidance pipe in the first modification is replaced by a guidance wall. Therefore, constituents in common with those in the embodiment and the first modification in the other configuration than the chamber will be referred to by the same signs respectively and correspondingly, and description thereof will be omitted suitably.

As shown in FIG. 10 and FIG. 11, the chamber 201 according to the second modification is formed into a box shape having a predetermined expansion chamber. A circularly cylindrical connection port 202 is formed substantially in the center of a front face of the chamber 201. A downstream end of a catalyst casing 80 is connected to the connection port 202.

A partition wall 203 for partitioning an internal space into a front part and a rear part is provided in the chamber 201. The internal space of the chamber 201 is divided into a front upstream space S1 and a rear downstream space S2 by the partition wall 203. In addition, a communication pipe 207 for communicating the upstream space S1 and the downstream space S2 with each other is provided in the partition wall 203.

Particularly, in the second modification, a guidance wall 204 for guiding exhaust gas which has passed through a catalyst to a downstream sensor 91 is provided in the chamber 201. The guidance wall 204 is provided to extend along an upstream outer wall of the chamber 201 i.e. a front wall portion 205 at a right side of the chamber 201. The guidance wall 204 is formed to partition a portion of the internal space (the upstream space S1) of the chamber 201. Specifically, the guidance wall 204 is formed into an L-shaped plate-like body in a top view, in which the guidance wall 204 extends rearward from a downstream end of the catalyst 8 and is then bent rightward in the upstream space S1. A predetermined space S3 is formed at a right front corner portion of the chamber 201 by the guidance wall 204.

A front end of the guidance wall 204 is arranged to overlap with the downstream end of the catalyst 8 in a back view. Specifically, the front end of the guidance wall 204 is arranged slightly closely to the right side within a section of the catalyst 8. A downstream end of the guidance wall 204 is opposed to a side wall portion 206 of the chamber 201 and arranged with a small gap formed with respect to the side wall portion 206. Incidentally, the downstream end (a right end) of the guidance wall 204 may be connected to the side wall portion 206. In addition, a plurality of through holes 208 are formed to penetrate the downstream end of the guidance wall 204 in a front/rear direction (a thickness direction).

In the second modification, the downstream sensor 91 is attached to penetrate the front wall portion 205. One end side of the downstream sensor 91 is exposed in the predetermined space S3 in the chamber 201. In this manner, the downstream sensor 91 is provided to be consistent with the catalyst 8 in an axial direction.

As described above, the guidance wall 204 is provided to extend along an outer wall (the front wall portion 205) of the chamber 201. Thus, the downstream sensor 91 can be arranged at a right front portion of the chamber 201 where a relatively ample space can be secured. Accordingly, the downstream sensor 91 can be arranged easily without interfering with any other peripheral component. Further, the downstream sensor 91 can be arranged without changing the shape of the chamber 201 and without reducing the volume thereof.

In the chamber 201 configured thus, exhaust gas which has been purified by the catalyst 8 flows directly into the upstream space S1 at a left half portion of the connection port 202 as shown in FIG. 8, when the exhaust gas flows into the chamber 201. On the other hand, the front end of the guidance wall 204 overlaps with the catalyst 8 at a right half portion of the connection port 202, as described above. Accordingly, a portion of the exhaust gas is guided by the guidance wall 204 to flow into the predetermined space S3.

A flow channel for the exhaust gas which has flowed into the predetermined space S3 is bent rightward along the guidance wall 204. As a result, the exhaust gas touches the downstream sensor 91. Thus, a portion of the exhaust gas is guided to the downstream sensor 91 by the guidance wall 204. Accordingly, the exhaust gas is not diffused into the chamber 201 so that a sensor output can be obtained stably. That is, the predetermined space S3 partitioned by the guidance wall 204 functions as a detection space for detecting the purified exhaust gas by the downstream sensor 91. In addition, the degree of freedom for arranging the downstream sensor 91 in accordance with the shape of the guidance wall 204 can be improved.

In addition, the plurality of through holes 208 are formed at the downstream end of the guidance wall 204 (at the rear of the downstream sensor 91), as described above. Thus, the exhaust gas inside the predetermined space S3 can be made to flow into the upstream space S1. Accordingly, it is possible to prevent the exhaust gas from being stagnated inside the predetermined space S3 and it is possible to prevent internal pressure of the predetermined space S3 from increasing. In addition, since the flow of the exhaust gas inside the predetermined space S3 is not impeded, an output of the downstream sensor 91 is also not affected.

Incidentally, the invention is not limited to the aforementioned embodiment but can be changed and carried out variously. In the aforementioned embodiment, the sizes or shapes etc. illustrated in the accompanying drawings are not limited to the ones which have been described, but can be changed suitably within a scope that the effect of the invention can be exerted. In addition thereto, the sizes or shapes, etc. can be changed and carried out suitably without departing from the scope of the object of the invention.

For example, the aforementioned embodiment has a configuration in which the upstream sensor 90 is arranged immediately before the catalyst 8. However, the aforementioned embodiment is not limited to this configuration. The upstream sensor 90 may be arranged in any position as long as the upstream sensor 90 is at the upstream side of the catalyst 8. For example, the upstream sensor 90 may be arranged in front of the engine casing 30.

In addition, the aforementioned embodiment has a configuration in which the recess portion 31a of the oil pan 31 is provided closely to the right side of the vehicle. However, the aforementioned embodiment is not limited to the configuration. For example, the recess portion 31a of the oil pan 31 may be provided closely to the left side of the vehicle or may be provided in the center in the vehicle width direction.

Figure 12:
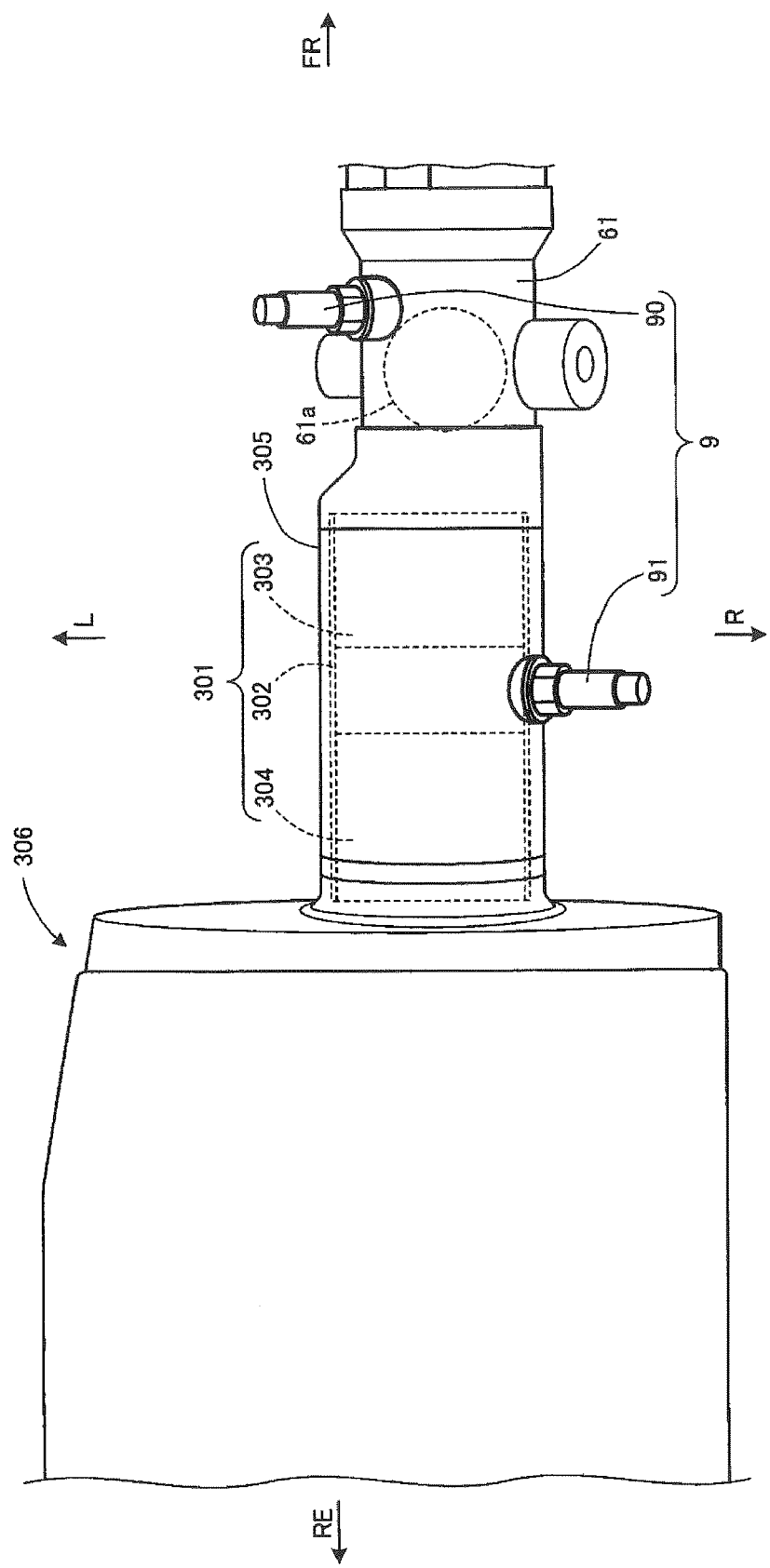
FIG. 12 is a top view showing an exhaust gas sensor arrangement structure according to a third modification.
Figure 13:
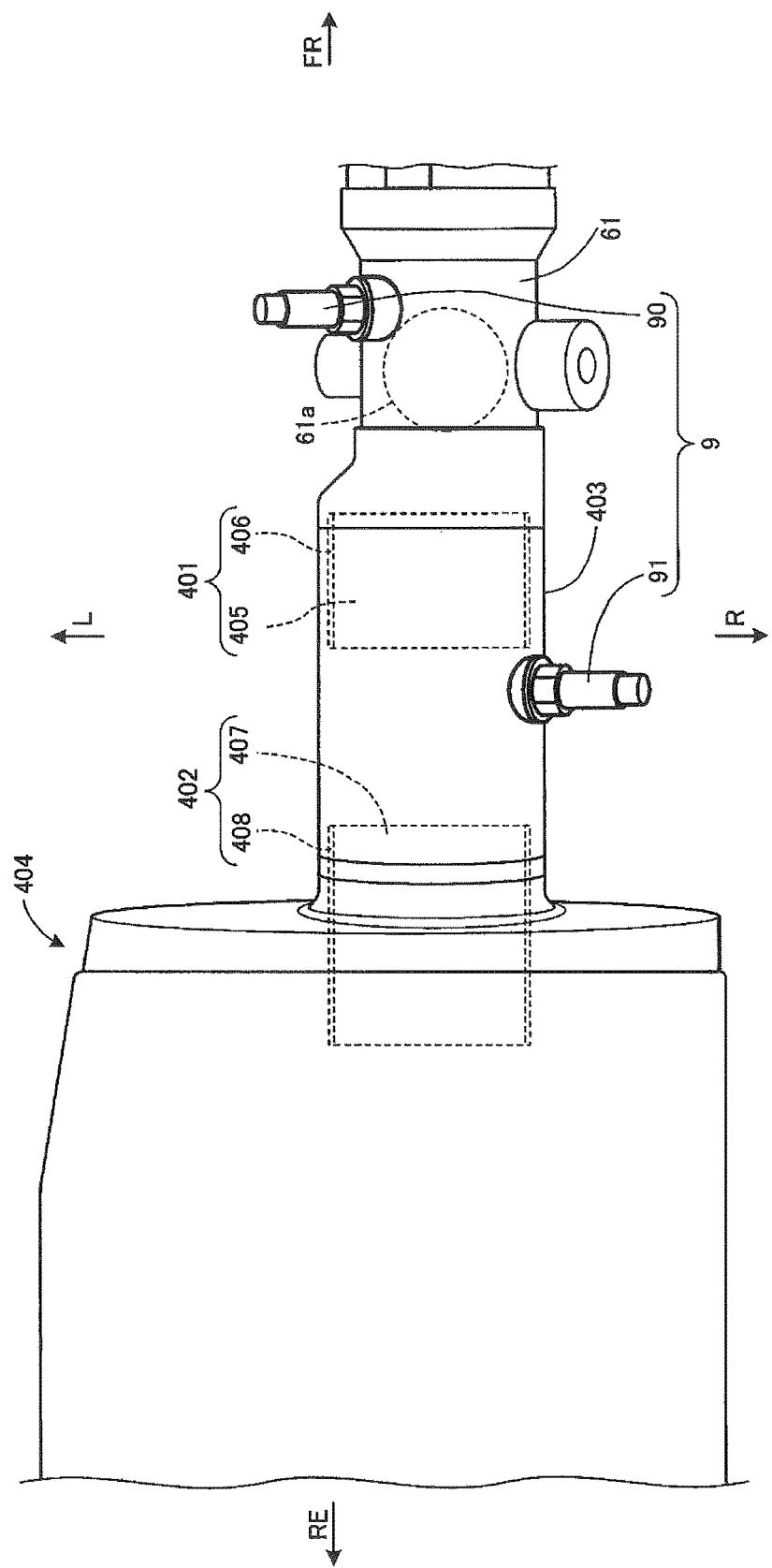
FIG. 13 is a top view showing an exhaust gas sensor arrangement structure according to a fourth modification.

In addition, the aforementioned embodiment has a configuration in which one single catalyst 8 is provided. However, the aforementioned embodiment is not limited to the configuration. For example, the aforementioned embodiment may be an exhaust gas sensor arrangement structure shown in FIG. 12 or FIG. 13. FIG. 12 is a top view showing an exhaust gas sensor arrangement structure according to a third modification. FIG. 13 is a top view showing an exhaust gas sensor arrangement structure according to a fourth modification. A configuration of a catalyst and an arrangement place of a downstream sensor in the third and fourth modifications are different from those in the embodiment. Constituents in common with those in the embodiment will be referred to by the same signs below respectively and correspondingly, and description thereof will be omitted suitably.

In the modification shown in FIG. 12, a so-called tandem catalyst having a plurality of (two in FIG. 12) honeycomb portions 303 and 304 inside an outer cylinder portion 302 is used as a catalyst 301. The catalyst 301 is received in a catalyst casing 305 extending in a front/rear direction, and a chamber 306 is connected to a rear end of the catalyst casting 305. As described above, the catalyst 301 has the two honeycomb portions 303 and 304 into which the catalyst 301 is divided in the front/rear direction, and the outer cylinder portion 302 with which the honeycomb portions 303 and 304 are covered. The front honeycomb portion 303 is arranged closely to an upstream end of the outer cylinder portion 302. The rear honeycomb portion 304 is arranged closely to a downstream end of the outer cylinder portion 302. Thus, a small gap is formed between the honeycomb portion 303 and the honeycomb portion 304.

In the third modification, a downstream sensor 91 is arranged between the honeycomb portion 303 and the honeycomb portion 304. Specifically, one end side (a detection portion) of the downstream sensor 91 penetrates the catalyst casing 305 and the outer cylinder portion 302 to be exposed in a space between the honeycomb portion 303 and the honeycomb portion 304. In this case, deterioration of the front honeycomb portion 303 can be determined based on outputs of an upstream sensor (not shown) and the downstream sensor 91.

According to these configurations, the downstream sensor 91 is arranged between the plurality of divided honeycomb portions 303 and 304. Thus, it is unnecessary to arrange the downstream sensor 91 in the chamber 306. As a result, the downstream sensor 91 can be arranged closely to the catalyst 301 (honeycomb portion 303) without largely changing an existing configuration (the chamber 306 etc.). In addition, when the size of the catalyst 301 has to be increased, the catalyst 301 is divided into a plurality so that the size of each of the catalysts (the honeycomb portions 303 and 304) can be reduced. Accordingly, the degree of freedom for a catalyst layout can be enhanced. In addition, when the sizes of the honeycomb portions 303 and 304 are changed, the degree of freedom for arranging the downstream sensor 91 can be improved.

In addition, in the modification shown in FIG. 13, a so-called dividable catalyst which is divided into two, i.e. a sub catalyst 401 (first catalyst) and a main catalyst 402 (second catalyst) is used as the catalyst. The sub catalyst 401 and the main catalyst 402 are received in a catalyst casing 403 extending in a front/rear direction. A chamber 404 is connected to a rear end of the catalyst casing 403.

The sub catalyst 401 is arranged in front of the chamber 404 and at an upstream end of the catalyst casing 403 under an engine 3 (see FIG. 1). The sub catalyst 401 is constituted by a honeycomb portion 405, and an outer cylinder portion 406 with which the honeycomb portion 405 is covered. A front half portion of the main catalyst 402 is received in the rear end of the catalyst casing 403, and a rear half portion of the main catalyst 402 protrudes into the chamber 404. The main catalyst 402 is constituted by a honeycomb portion 407, and an outer cylinder portion 408 with which the honeycomb portion 407 is covered. A predetermined gap is formed between the sub catalyst 401 and the main catalyst 402.

In the fourth modification, a downstream sensor 91 is arranged closely to a downstream end side of the sub catalyst 401 and between the sub catalyst 401 and the main catalyst 402. One end side (a detection portion) of the downstream sensor 91 penetrates the catalyst casing 403 to be exposed in a space between the sub catalyst 401 and the main catalyst 402. In this case, deterioration of the sub catalyst 401 can be determined based on outputs of an upstream sensor (not shown) and the downstream sensor 91.

According to these configurations, the downstream sensor 91 is arranged between the sub catalyst 401 and the main catalyst 402. Thus, it is unnecessary to arrange the downstream sensor 91 in the chamber 404. As a result, the downstream sensor 91 can be arranged closely to the sub catalyst 401 without largely changing an existing configuration (the chamber 404). In addition, the catalyst is divided into a plurality so that the size of each catalyst can be reduced. Thus, the degree of freedom for a catalyst layout can be enhanced.

As described above, the invention has an effect that exhaust gas sensors can be arranged before and behind a catalyst without spoiling detection accuracy. Particularly, the invention is useful for an exhaust gas sensor arrangement structure.

What is claimed is:

1. An exhaust gas sensor arrangement structure, comprising:
   a catalyst which purifies exhaust gas of an engine;
   exhaust gas sensors which detect an exhaust gas component of the engine;
   an oil pan which is provided in a lower portion of the engine; and
   a chamber;
   wherein:
   the catalyst is provided under the engine;
   the exhaust gas sensors are provided within a width of the engine in a front/rear direction so that the catalyst is provided between the exhaust gas sensors at front and rear sides of the catalyst;
   a first recess portion is formed in the oil pan;
   the catalyst is provided to extend along the first recess portion;
   the exhaust gas sensors comprise an upstream sensor which is provided at an upstream side of the catalyst and a downstream sensor which is provided at a downstream side of the catalyst;
   the oil pan is positioned between the upstream sensor and the downstream sensor in a side view;
   the chamber is connected to the downstream side of the catalyst;
   a second recess portion is formed at a front face of the chamber;
   the downstream sensor is attached to the second recess portion of the chamber;
   the catalyst comprises a honeycomb portion, and an outer cylinder portion with which the honeycomb portion is covered;
   the outer cylinder portion extends to an inside of the chamber at a downstream side of the honeycomb portion; and
   the downstream sensor is attached to the outer cylinder portion inside the chamber.

2. The exhaust gas sensor arrangement structure according to claim 1, wherein the recess portion of the oil pan is provided closely to a same side as the recess portion of the chamber in a vehicle width direction.

3. The exhaust gas sensor arrangement structure according to claim 1, wherein the downstream sensor is provided within a width of the chamber in a vehicle width direction in a front view.

4. The exhaust gas sensor arrangement structure according to claim 1, wherein:
   the honeycomb portion is divided into a plurality of parts inside the outer cylinder portion; and
   the downstream sensor is arranged among the plurality of divided parts of the honeycomb portion.

5. The exhaust gas sensor arrangement structure according to claim 1, wherein:
   the chamber has a guidance pipe which guides exhaust gas having passed through the catalyst to the downstream sensor;
   the guidance pipe is provided to overlap with a downstream end of the catalyst; and
   the downstream sensor is attached to the guidance pipe.

6. The exhaust gas sensor arrangement structure according to claim 5, wherein:
   the guidance pipe is provided to extend along an upstream outer wall of the chamber; and
   the downstream sensor is attached to penetrate the outer wall and the guidance pipe.

7. An exhaust gas sensor arrangement structure, comprising:
   a catalyst which purifies exhaust gas of an engine;
   exhaust gas sensors which detect an exhaust gas component of the engine;
   an oil pan which is provided in a lower portion of the engine; and
   an exhaust control valve which adjusts a flow rate of exhaust gas;
   wherein:
   the catalyst is provided under the engine;
   the exhaust gas sensors are provided within a width of the engine in a front/rear direction so that the catalyst is provided between the exhaust gas sensors at front and rear sides of the catalyst;
   a recess portion is formed in the oil pan;
   the catalyst is provided to extend along the recess portion;
   the exhaust gas sensors comprise an upstream sensor which is provided at an upstream side of the catalyst and a downstream sensor which is provided at a downstream side of the catalyst;
   the oil pan is positioned between the upstream sensor and the downstream sensor in a side view;
   the exhaust control valve is provided between the upstream sensor and the catalyst; and
   the upstream sensor, the exhaust control valve, the catalyst and the downstream sensor are provided substantially on a same straight line.

8. An exhaust gas sensor arrangement structure, comprising:
- a catalyst which purifies exhaust gas of an engine;
- exhaust gas sensors which detect an exhaust gas component of the engine;
- an oil pan which is provided in a lower portion of the engine; and
- a chamber;

wherein:
- the catalyst is provided under the engine;
- the exhaust gas sensors are provided within a width of the engine in a front/rear direction so that the catalyst is provided between the exhaust gas sensors at front and rear sides of the catalyst;
- a recess portion is formed in the oil pan;
- the catalyst is provided to extend along the recess portion;
- the exhaust gas sensors comprise an upstream sensor which is provided at an upstream side of the catalyst and a downstream sensor which is provided at a downstream side of the catalyst;
- the oil pan is positioned between the upstream sensor and the downstream sensor in a side view;
- the chamber is connected to the downstream side of the catalyst;
- the chamber has a guidance wall which guides exhaust gas having passed through the catalyst to the downstream sensor;
- the guidance wall is formed to partition a portion of an internal space of the chamber; and
- the downstream sensor is provided inside a predetermined space partitioned by the guidance wall.

9. The exhaust gas sensor arrangement structure according to claim 8, wherein:
- the guidance wall is formed to extend along an upstream outer wall of the chamber; and
- the downstream sensor is attached to penetrate the outer wall.

10. An exhaust gas sensor arrangement structure, comprising:
- a catalyst which purifies exhaust gas of an engine;
- exhaust gas sensors which detect an exhaust gas component of the engine;
- an oil pan which is provided in a lower portion of the engine; and
- a chamber;

wherein:
- the catalyst is provided under the engine;
- the exhaust gas sensors are provided within a width of the engine in a front/rear direction so that the catalyst is provided between the exhaust gas sensors at front and rear sides of the catalyst;
- a recess portion is formed in the oil pan;
- the catalyst is provided to extend along the recess portion;
- the exhaust gas sensors comprise an upstream sensor which is provided at an upstream side of the catalyst and a downstream sensor which is provided at a downstream side of the catalyst;
- the oil pan is positioned between the upstream sensor and the downstream sensor in a side view;
- the chamber is connected to the downstream side of the catalyst;
- the catalyst comprises a first catalyst which is provided in front of the chamber and under the engine, and a second catalyst which is provided inside the chamber; and
- the downstream sensor is provided between the first catalyst and the second catalyst.

* * * * *